(12) United States Patent
Carneiro et al.

(10) Patent No.: US 11,836,617 B2
(45) Date of Patent: Dec. 5, 2023

(54) TECHNIQUES FOR ANALYTICAL INSTRUMENT PERFORMANCE DIAGNOSTICS

(71) Applicant: WATERS TECHNOLOGIES CORPORATION, Milford, MA (US)

(72) Inventors: John Carneiro, Milford, MA (US); Richard Earle, Uxbridge, MA (US); Aaron Lebeau, Taunton, MA (US); Robert J Dumas, Upton, MA (US); David Lamborghini, Mansfield, MA (US)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 662 days.

(21) Appl. No.: 16/897,754

(22) Filed: Jun. 10, 2020

(65) Prior Publication Data

US 2020/0387790 A1 Dec. 10, 2020

Related U.S. Application Data

(60) Provisional application No. 62/859,565, filed on Jun. 10, 2019.

(51) Int. Cl.
*G06N 3/08* (2023.01)
*G06N 3/10* (2006.01)
*G06F 11/34* (2006.01)

(52) U.S. Cl.
CPC .......... *G06N 3/08* (2013.01); *G06F 11/3447* (2013.01); *G06N 3/10* (2013.01)

(58) Field of Classification Search
CPC .......... G06N 3/08; G06N 20/10; G06N 20/00; G06N 7/005; G06N 3/02; G05B 23/024; G05B 23/0254; G05B 23/0221; G05B 19/042; G01M 13/028; G01M 13/045; G06F 11/008; G06F 11/0751; G06F 11/3447; G06F 17/18
USPC .... 700/19, 26–28, 30, 108–110, 117; 702/1, 702/32–33, 35, 85, 104, 108, 127, 179,
(Continued)

(56) References Cited

U.S. PATENT DOCUMENTS

| | | | |
|---|---|---|---|
| 2015/0233873 A1* | 8/2015 | Yanagisawa | G01N 30/8658 702/24 |
| 2019/0163848 A1* | 5/2019 | McGranahan | G06F 11/3447 |
| 2022/0128474 A1* | 4/2022 | Tulsyan | C12M 41/48 |

FOREIGN PATENT DOCUMENTS

CN 111936844 A * 11/2020 .......... B01J 19/0033

OTHER PUBLICATIONS

Dickinson, I., "Model-Based Reasoning in Analytical Instrumentation," Laboratory Robotics and Automation, VCH Publishers, Inc., New York, NY vol. 5, No. 2, Apr. 1993, pp. 85-96, XP002092815, ISSN: 0895-7533. (Year: 1993).*

(Continued)

*Primary Examiner* — Jeffrey P Aiello
(74) *Attorney, Agent, or Firm* — Goodwin Procter LLP

(57) ABSTRACT

Techniques and apparatus for diagnostic processes for analytical instruments are described. In one embodiment, for example, an apparatus may include at least one memory, and logic coupled to the at least one memory. The logic may be configured to receive diagnostic information associated with at least one analytical instrument, and process the diagnostic information using a computational model to generate at least one diagnostic model for at least one diagnostic. Other embodiments are described.

13 Claims, 40 Drawing Sheets

(58) Field of Classification Search
USPC .............. 702/181–185, 188–189; 703/2, 6; 706/14; 714/25–26, 37
See application file for complete search history.

(56) References Cited

OTHER PUBLICATIONS

International Search Report and Written Opinion for International application No. PCT/US2020/036962, dated Dec. 12, 2020, 21 pages.
Dickinson, I., "Model-Based Reasoning in Analytical Instrumentation" Laboratory Robotics and Automation, 5(2):85-96 (1993).

* cited by examiner

*Diagnostic Configuartion*
*405*

Field Description:

- plot_type: Trend, Circular, Cycle
- plot_style: Overlay, Stack
- datastore: file, dynamodb, rds, s3
- datastore_url: AWS datastore URL
- instruments (multiple allowed)
  - id: instrument serial number
  - address: instrument ip address
  - type: instrument type
  - processor: instrument processing function name (None, diagnostic_capture, diagnostic_train, diagnostic_test)
  - models (multiple allowed – one per internal device diagnosis)
    - id – model name
    - input – comma delimited input channel names
    - output – diagnosis output field name
- channels (multiple allowed – one per internal device sensor, and/or derived channels)
  - id – channel name (internal DynamicData convention 'Component:Name')
  - units - channel units
  - scaleFactor – channel scale factor
  - processor – channel processing function name (user specified, denotes this channel is derived from others)

```
CONSOLE $ dump diagnostic ----------
CONSOLE ------ Dump of Diagnostic ----------
CONSOLE ProcessedDiagnosis: 100.000000 % OK
CONSOLE ProcessedDiagnosisPumpAPrimaryTransducer: 100.000000 % OK
CONSOLE ProcessedDiagnosisPumpAPrimaryTransducer: 100.000000 % OK
CONSOLE ProcessedDiagnosisPumpAPrimaryEncoder: 100.000000 % OK
CONSOLE ProcessedDiagnosisPumpAccumulatorEncoder: 100.000000 % OK
CONSOLE ProcessedDiagnosisVentValve: 100.000000 % OK
CONSOLE ProcessedDiagnosisPowerSupply24V: 100.000000 % OK
CONSOLE ProcessedDiagnosisPrime: 100.000000 % OK
CONSOLE ProcessedDiagnosisCheckValve: 100.000000 % OK
CONSOLE ProcessedDiagnosisProgress: 0
CONSOLE diagnosticState: 0
CONSOLE testTimeElapsedMilliSeconds: 0
CONSOLE $ help diagnostic
CONSOLE Diagnostic (enabled) - Diagnostic Command Suite
CONSOLE   DiagnosticTest  - Diagnostic test
CONSOLE   DiagnosticTrain - Diagnostic train
CONSOLE
CONSOLE
CONSOLE
CONSOLE
CONSOLE
CONSOLE
```

Concept:
Failure Indicators and Failure Causes

- Failure Indicators:
  - Changes from benchmark values in these categories

| Failure Indicator Categories | | | | | |
|---|---|---|---|---|---|
| Changes in peak Retention Time | Changes in peak Area | Changes in peak Shape | Changes in peak Width | Changes in System Pressure | Change in Number of peaks |
| -Increase<br>-Decrease<br>-Erratic<br>-Drifting | -Increase<br>-Decrease<br>-Erratic<br>-Drifting | -Fronting<br>-Tailing<br>-Splitting<br>-Shouldering | -Widen<br>-Narrow | -Increase<br>-Decrease<br>-Drifting<br>-Erratic | -Missing<br>-Extra |

- Failure Causes:
  - Source of the Failure Indicator
    - Typically instrument, column, method or analyst related
  - Indicators can be induced from various causes

List Possible Causes for Failure Indicators Present and Evaluate vs. Failure Fingerprint

- Missing Peak
  - Evaporative loss of analyte(s)
  - Degradation of analyte(s)
  - Sample preparation error
  - Loss of detector sensitivity
  - Co-elution with another analyte
  - Wrong integration method used

- Decrease in peak area
  - Evaporative loss of analyte(s)
  - Degradation of analyte(s)
  - Wrong method/injection volume used
  - Change in split factor
  - Sample preparation error
  - Sample volume getting low
  - Weak needle wash empty or low
  - Leak in sample fluidics
  - Bubble in sample fluidics line
  - Weak needle wash not compatible with sample
  - Loss of detector sensitivity
  - Injection Needle Damaged
  - Injection Needle did not draw enough sample Step 1: Eliminate causes that do not explain both/all indicators (not consistent)
Step 2: Eliminate causes that do not explain other known information (not consistent)
Step 3: Test causes until the problem is resolved. Document failure for future troubleshooting

List Possible Causes for Failure Indicators Present and Evaluate vs. Failure Fingerprint

- Peak Shouldering:
  - Column degradation
  - Particulates accumulating on inlet frit
  - Sample diluent effects
  - Weak needle wash not compatible with separation
  - System tubing not seated properly
  - Change in mobile phase pH
    - Can cause multiple charge states for an analyte

- Increased Retention Time:
  - Leak in system
  - Organic solvent not being pumped properly
  - Change in mobile phase pH
    - Bases: increase in pH = increased retention
    - Acids: decrease in pH = increased retention
  - Column degradation
  - Column not properly equilibrated
  - Wrong solvent/method being used Step 1: Eliminate causes that do not explain both/all indicators (not consistent)
Step 2: Eliminate causes that do not explain other known information (not consistent)
Step 3: Test causes until the problem is resolved. Document failure for future troubleshooting

List Possible Causes for Failure Indicators Present and Evaluate vs. Failure Fingerprint

- Organic solvent not being pumped properly
- Change in mobile phase pH
  - For basic analytes: a decrease in pH will cause decreased retention
  - For acidic analytes: an increase in pH will cause decreased retention
- Column degradation
  - Ligand hydrolysis
- Column not properly equilibrated
- Wrong solvent/method being used
- Sample diluent effect Step 1: Eliminate causes that do not explain indicators (not consistent)

Step 2: Eliminate causes that do not explain other known information (not consistent)

Step 3: Prioritize remaining Causes based on likelihood/ease of testing

1. Column not properly equilibrated
2. Column degradation
3. Organic Solvent not being delivered properly Step 4: Test causes

*FIG. 25*

List Possible Causes for Failure Indicators Present and Evaluate vs. Failure Fingerprint

2705

- Erratic System Pressure
  - Plunger/Seal degradation
  - Check valve problem
  - Solvent inlet filter clogged
  - Solvent mixer failure
  - Column degradation

- Decreased Retention Time
  - Solvent Not Delivered Properly
  - Change in mobile phase pH
    - Bases: decrease in pH = decreased retention
    - Acids: increase in pH = decreased retention
  - Column degradation
  - Column not properly equilibrated
  - Wrong solvent/method being used
  - Sample diluent effect Erratic System Pressure Causes all affect how the solvent is delivered.

All consistent and "match" the Decreased Retention Time Cause "Solvent Not Delivered Properly"

Step 1: Eliminate causes that do not explain indications (not consistent)

Step 2: Test causes until the problem is resolved. Document failure for future troubleshooting

*FIG. 27*

List Possible Causes for Failure Indicators Present and Evaluate vs. Failure Fingerprint

2905

- Increased System Pressure
  - Particulates accumulating on column inlet frit
  - Column degradation
  - Sample precipitation onto column
  - Clog in system tubing
  - Wrong method being used
  - Change in column temperature
    ○ A lower column temperature leads to higher system pressure Step 1: Eliminate causes that do not explain indicators (not consistent)
Step 2: Test causes until the problem is resolved. Document failure for future troubleshooting Clog in system checked first
• Flow rate accuracy meet instrument specification No Post-Repair Chromatograms available. Failure caused by particulates accumulating on column inlet frit or sample precipitation onto column.

Sample preparation
• Crush tablet
• Dilute with mobile phase
• Filter with 0.2 μm filter
• Inject Work done to extend column lifetime included sample preparation and modifying column wash solvents.

List Possible Causes for Failure Indicators Present and Evaluate vs. Failure Fingerprint

- Erratic Retention Time:
  - Solvent delivery failure
  - Gradient mixing failure
  - Column degradation Step 1: Eliminate causes that do not explain indicators (not consistent)

All causes consistent, additional information needed:
- Does using the same column on a different instrument yield same results (rules out column degradation)?
- Does a different column also produce erratic retention time?

Failure caused by the solvent not being delivered properly. Pump was PM'ed and the qualification check was re-run. 5 replicates all yield same retention time (data not shown)

*FIG. 31*

List Possible Causes for Failure Indicators Present and Evaluate vs. Failure Fingerprint

3305

- Drifting Retention Time:
  - Column not equilibrated to starting method conditions
  - Column not equilibrated to column temperature
  - Solvent delivery failure
  - Gradient mixing failure
  - Column degradation
  - Degradation of mobile phase additives Testing Sequence:
1. Column not equilibrated to mobile phase
   1. Equilibrate for 10CV
   2. Still drifting over multiple injections
2. Column not equilibrated to temperature
   1. Allowed to sit at temperature for 5 minutes
   2. Cause Found
3. Solvent delivery failure (not tested)
4. Gradient mixing failure (not tested)
5. Column degradation (not tested)

Step 1: Eliminate causes that do not explain indicators (not consistent)
Step 2: Test causes until the problem is resolved.
Document failure for future troubleshooting

List Possible Causes for Failure Indicators Present and Evaluate vs. Failure Fingerprint

- Decrease in Peak Area:
  - Evaporative loss of analytes
  - Degradation of analytes
  - Wrong method/injection volume used
  - Change in split factor
  - Sample preparation error
  - Sample volume getting low
  - Weak needle wash empty or low
  - Leak in sample fluidics
  - Bubble in sample fluidics line
  - Weak needle wash not compatible with sample
  - Loss of detector sensitivity
  - Injection Needle damaged
  - Injection needle not drawing enough liquid Step 1: Eliminate causes that do not explain indicators (not consistent)

Step 2: Prioritize and test consistent causes
- New vial tested
  - eliminates degradation, and low sample volume
- Weak needle wash had sufficient volume
- No leaks detected in sample fluidics
- No bubbles detected in sample fluidics
- Needle was not damaged
- Splitter changed configuration
  - Benchmark used 5 split
  - Qualification check used 10 split

List Possible Causes for Failure Indicators Present and Evaluate vs. Failure Fingerprint

- Extra Peaks:
  - Carryover from previous injection
  - Sample preparation failure
  - Analyte separating as two peaks
    - When integrated both peaks can be "picked" leading to an "extra" peak in the results
  - Contaminated mobile phase
  - Contaminated system
  - Wrong integration method used
    - A smaller peak or background noise can be "picked" leading to an "extra" peak in the results Step 1: Eliminate causes that do not explain indicators (not consistent)

Step 2: Prioritize and Test Consistent Causes

Testing Sequence:
- Replicate blank injections (testing carryover)
- Open new standard and inject (testing sample preparation
  - Failure found.
  - Previous standard was contaminated with caffeine during preparation of samples.

List Possible Causes for Failure Indicators Present and Evaluate vs. Failure Fingerprint

- Decreased Retention Time
  - Organic solvent not being pumped properly
  - Change in mobile phase pH
  - Change in system tubing
  - Column degradation
  - Column not properly equilibrated
  - Wrong solvent/method being used
  - Sample diluent effect

- Peak Widening
  - Change in system tubing
  - System tubing not seated properly
  - Change in mobile phase pH
  - Column degradation
  - Wrong method being used
  - Sample diluent effects

- Peak Narrowing
  - Change in system tubing
  - Change in mobile phase pH
  - Wrong method being used
  - Column Degradation Step 1: Eliminate causes that do not explain both/all indicators (not consistent)

Step 2: Eliminate causes that do not explain other known information (not consistent)

Step 3: Prioritize and Test Consistent Causes
•System Tubing not changed between injections

TECHNIQUES FOR ANALYTICAL INSTRUMENT PERFORMANCE DIAGNOSTICS

CROSS REFERENCE TO RELATED APPLICATIONS

This application claims priority to U.S. Provisional Application No. 62/859,565, filed Jun. 10, 2019 and entitled "TECHNIQUES FOR ANALYTICAL INSTRUMENT PERFORMANCE DIAGNOSTICS", which is hereby incorporated by reference.

TECHNICAL FIELD

Embodiments herein generally relate to managing analytical instruments, and, more particularly, to processes for monitoring analytical instrument performance and diagnosing analytical instrument abnormal operating conditions.

BACKGROUND

The performance of analytical instruments is continually monitored to ensure data quality. Analytical instruments, such as mass spectrometry (MS) and/or liquid chromatography-mass spectrometry (LC-MS) systems are capable of providing detailed characterization of complex sample sets. However, the ability to perform analyses to obtain precise, detailed analytical data causes MS and LC-MS systems to be susceptible to operational instability, including hardware and/or software issues that are difficult to detect and diagnose. Such issues may be due to an existing or imminent component failure, human error, incorrect system configuration, and/or the like. In conventional systems, determining a root cause typically involves an extensive and time-consuming process of trial and error performed by operators that may be experienced with running methods on an analytical instrument, but may not have adequate knowledge of particular system components to efficiently determine a diagnosis.

BRIEF DESCRIPTION OF THE DRAWINGS

FIG. 4 depicts a configuration structure for a diagnostic.

FIGS. 5-16 illustrate graphs and associated data capture files for various diagnostic scenarios according to some embodiments.

FIGS. 17-39 depict illustrative diagnostic scenarios for a chromatography system according to some embodiments

DETAILED DESCRIPTION

Figure 1:
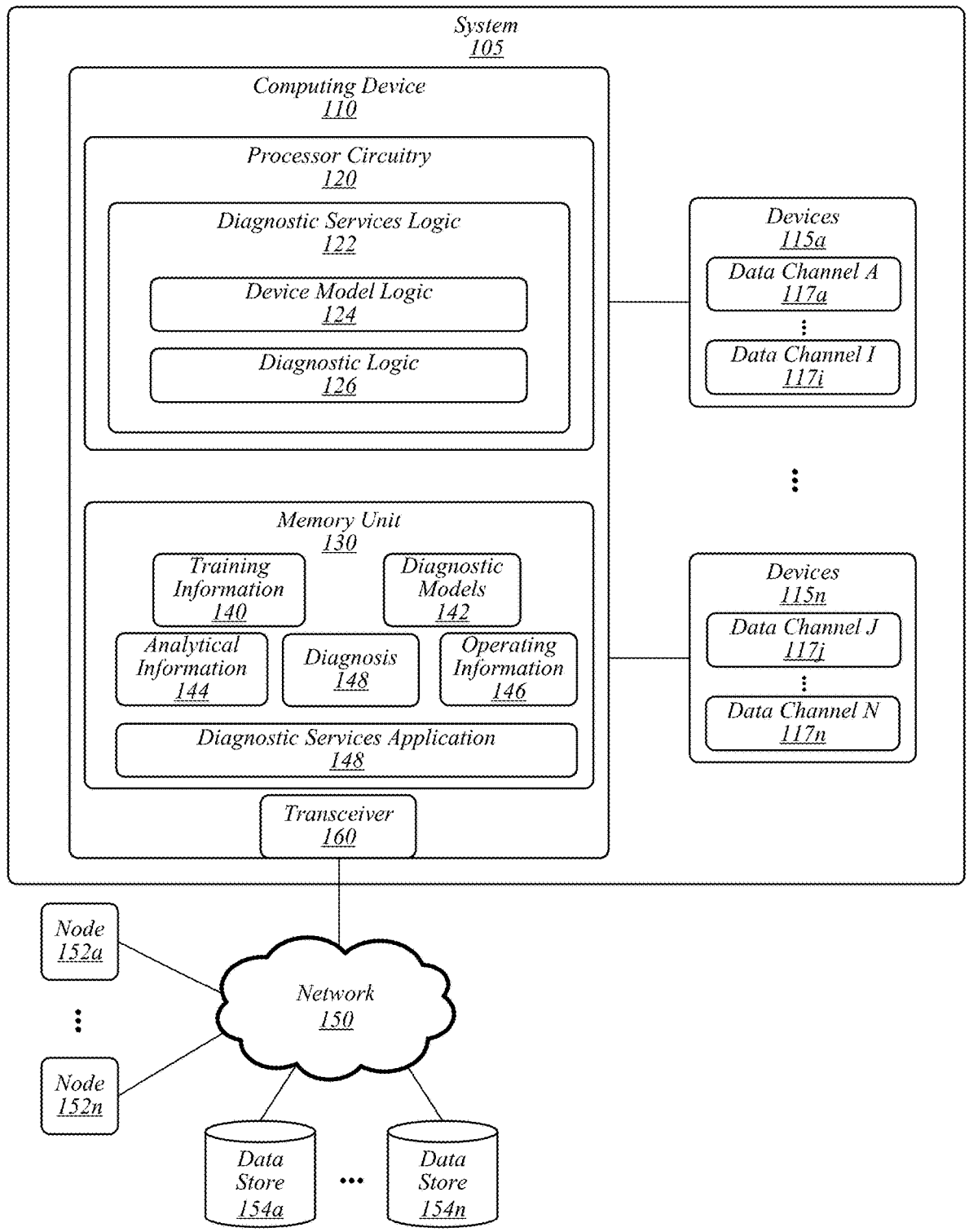
FIG. 1 illustrates an embodiment of a first operating environment according to an embodiment.

Various embodiments may generally be directed toward systems, methods, and/or apparatus for monitoring the performance of analytical instruments. In some embodiments, a diagnostic services process may be operative to determine standard operating conditions for an analytical instrument and/or components thereof. In various embodiments, standard operating conditions may include analytical instrument operation associated with standard reference data (for instance, data corresponding to normal, expected, and/or the like operation of the analytical instrument). In exemplary embodiments, the diagnostic services process may operate to determine non-standard operating conditions for the analytical instrument and/or components thereof. In various embodiments, non-standard operating conditions may include analytical instrument operation associated with non-standard reference data (for instance, data corresponding to abnormal, unexpected, component failure (or imminent failure) condition, instrument error condition, and/or the like operation of the analytical instrument). In some embodiments, the diagnostic services process may operate to determine a cause of a non-standard operating condition.

In various embodiments, data generated during operation of an analytical instrument and/or components thereof may be accessed, for instance, via data channels. Some embodiments may implement automated computer software with machine learning via a neural network and big data, for instance, large data sets that may be analyzed computationally to reveal patterns, trends, and associations between data channels. The diagnostic services process may operate to perform training processes using the data. Non-limiting examples of training processes may include developing pass/fail input/output function(s) to determine the behavior of a given instrument against a pool of recorded repeated positive/negative tests that occur in the normal operation of the instrument/system (for example, initialization, flow, or running an injection for a liquid chromatography-mass spectrometry (LC-MS) system). The diagnostic services processes may operate to perform testing processes, for instance, detecting and/or diagnosing instrument issue(s) (for instance, non-standard operating conditions) for an analytical instrument and/or components thereof. In various embodiments, the testing processes may include applying the pass/fail input/output function(s) to pre-determined tests (for instance, determined during the training processes) and providing the results and data collected to a store of training data.

In various embodiments, analytical instruments and/or components thereof may generate operating data in various possible scenarios including, without limitation, at rest, a short diagnostic test, or while under normal operation (for instance, performing an analysis method). In an exemplary embodiment, the operating data may be or may include time-based digitized binary analog data from internal devices. In some embodiments, the channel data may be subscribed to and read in via a logic component, processor, controller, circuitry, and/or the like residing on a computing device operably coupled to the analytical instrument and/or components thereof. In some embodiments, a system may include one or more analytical instruments, components thereof, and/or associated devices (for instance, a sample device, a reagent supply device, and/or the like). Each system may include and/or be associated with one or more logic components (or controllers).

In some embodiments, a logic component may receive configuration information for an analytical instrument and/or components thereof. In various embodiments, configuration information may include, without limitation, operating configurations, modes, ranges, parameters, thresholds, and/or the like. In some embodiments, a logic component may receive a configuration data item to perform a training process or mode using configuration data, channel data and associated diagnosis stored in a data store and input into one or more computational models (for instance, neural network(s)) to create a model per instrument, system, device, component, and/or the like, and/or operating mode, configuration, and/or the like thereof. In some embodiments, the logic component may receive a configuration data item to perform a testing process or mode using configuration data, real time channel data input into one or more computational models (for instance, neural network(s)) using model per instrument, system, device, component, and/or the like, and/or operating mode, configuration, and/or the like thereof determine one or more diagnosis. In various embodiments, test channel data and/or diagnosis information may be added to a training datastore. In some embodiments, a diagnosis for an instrument, system, device, component, and/or the like, and/or operating mode, configuration, and/or the like thereof may be provided to an operator for review, analysis, annotation (or "mark-up"), and/or the like.

In some embodiments, the diagnostic services process may include a machine learning framework having a form of $y=f(x)$, where y is the output, f is a prediction function, and x is the input. For example, for a training process, given a training set of labeled examples $\{(x1,y1), \ldots, (xN,yN)\}$, prediction function f may be estimated to minimize the prediction error on the training set. In another example, for a testing process, f may be applied to new test example x and output predicted value $y=f(x)$ may be determined.

In various embodiments, computational models may be generated for analytical systems, which may include analytical instruments, analytical instrument components, and/or associated devices. The computational models may include standard models and/or model data associated with standard operations (for instance, normal, expected, proper, within-range or threshold, and/or the like) in which the systems and/or components thereof (for instance, analytical instrument components, and/or associated devices) are operating properly, within accepted limits, and/or the like. The computational models may include non-standard models and/or non-standard model data associated with non-standard operations in which the systems and/or components thereof (for instance, analytical instrument components, and/or associated devices) are operating improperly, outside of accepted limits, and/or the like. In this manner, system failures and maintenance may be predicted via predictive modeling of systems and/or system components. Accordingly, diagnostic service processes according to some embodiments may determine when a system and/or system component has failed and/or predict when a system and/or system component will fail and address such issues earlier and with more accuracy than conventional systems that rely on operator-implemented trial-and-error techniques. Accordingly, systems operating according to some embodiments may achieve greater levels of operational efficiency as compared with conventional systems.

Some embodiments may operate diagnostic processes at various levels. For example, a level may include at the unit level, which may involve low-level discrete electro-mechanical sensing such as a motor, a solenoid, a column, and/or the like. In another example, a level may include a component level, which may involve sub-assembly component(s) such as a pump, heater cooler, sample handling, and/or the like. In a further example, a level may include a qualification level, which may include functional domain level such as product initialization, instrument qualification, instrument testing, and/or the like. In other examples, a level may include a comprehensive level, which may involve an application level representing the system, which may be inclusive to any post processed data (for instance, monitor instrument data (raw/processed) to correlate patterns and trends with specific hardware or method issues).

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include a system 105 operative to manage information associated with devices 115a-n. In some embodiments, devices 115a-n may be or may include an analytical instrument, components thereof (for instance, pumps, valves, instrument modules, and/or the like), devices associated therewith (for instance, sample management systems, reagent systems, and/or the like), and/or the like. In some embodiments, analytical instruments may be or may include a chromatography system, a liquid chromatography (LC) system, a gas chromatography (GC) system, a mass analyzer system, a mass detector system, a mass spectrometer (MS) system, an ion mobility spectrometer (IMS) system, a high-performance liquid chromatography (HPLC) system, a ultra-performance liquid chromatography (UPLC®) system, a ultra-high performance liquid chromatography (UHPLC) system, an ultraviolet (UV) detector, a visible light detector, a solid-phase extraction system, a sample preparation system, a sample introduction system, a pump system, a capillary electrophoresis instrument, combinations thereof, components thereof, variations thereof, and/or the like. Although LC, MS, and LC-MS are used in examples in this detailed description, embodiments are not so limited, as other analytical instruments capable of operating according to some embodiments are contemplated herein.

In various embodiments, devices 115a-n may be or may include various components, modules, and/or the like. Non-limiting examples of components may include detectors, solvent managers, sample managers, pumps, valves, electrodes, quadrupole elements, columns, ion source devices, sensors (for instance, pressure sensors, temperature sensors, flow sensors, and/or the like), data system hardware, data system software, and/or the like. In various embodiments, a device component may include any component that may be individually monitored (for instance, associated with operating information). In some embodiments, device 115a-n may be or may include an instrument system. In general, an instrument system may include a collection of instrument modules that operate collectively as a holistic unit. For example, an instrument system may include an analytical device (for instance, an LC or MS device) capable of providing analytical data (measurements) and supporting components (for example, an injector, detector, pump, control systems, and/or the like for an LC or MS system) that facilitate the generation of the analytical data by the analytical device. Embodiments are not limited in this context.

In some embodiments, devices 115a-n may operate to perform an analysis and generate analytical information 144. In various embodiments, analytical information 144 may include information, data, files, charts, graphs, images, textual information, and/or the like generated by an analytical instrument as a result of performing an analysis method. For example, for an LC-MS system, a device 115a-n may separate a sample and perform mass analysis on the separated sample according to a specified method to generate analytical information 144 that may include raw, native, or otherwise unprocessed data, chromatograms, spectra, peak lists, mass values, retention time values, concentration values, compound identification information, and/or the like. In various embodiments, analytical information 144 may include information resulting from a quality control process, such as a system suitability test, quality control check, and/or the like. In some embodiments, system 105 may include a plurality of devices 115a-n. In various embodiments, system 105 may include a single device 115a-n.

In various embodiments, system 105 may include computing device 110 communicatively coupled to devices 115a-n or otherwise configured to receive and store diagnostic information associated with devices 115a-n (for instance, stored in data store 154a-n or other remote data storage structure, including a cloud storage environment). In general, diagnostic information may include information associated with a device 115a-n that may be used to generate a diagnostic associated with the device 115a-n. In some embodiments, diagnostic information may include analytical information 144 and/or operating information 146. Analytical (or analysis) information 144 may include information generated by devices 115a-n as a result of performing an analysis. For example, for an LC-MS device, analytical information 144 may include, without limitation, compound lists, peaks, peak lists, quality control (QC) results, spectra, graphs, charts, and/or the like. In various embodiments, operating information 146 may include information associated with the operation of devices 115a-n. For example, operating information 146 may include a voltage of a pump used by an LC-MS device during the performance of an analysis. Non-limiting examples of operating information 146 may include voltages, currents, power, flow information (for instance, flow rate, blockage detection, and/or the like), component positions (for instance, valve open/close position), alarms, alarm codes, vibration detection, audio detection, video images, pressures, temperatures, software status, hardware status, and/or the like. In some embodiments, operating information 146 may be obtained via one or more data channels 117a-n associated with devices 115a-n, components thereof, sensors thereof (for instance, a pressure transducer associated with a pump, a position sensor associated with a valve, a video recorder associated with a component, and/or the like), and/or the like. Embodiments are not limited in this context.

In various embodiments, devices 115a-n and/or data channels 117a-n may operate to provide analytical information 144 and/or operating information 146 directly to computing device 110 and/or to a location on a network 150 accessible to computing device 110, such as a cloud computing environment, nodes 152a-n, data stores 154a-n, and/or the like. In various embodiments data channels 117a-n may operate using various forms of data including, without limitation, numeric, alphanumeric, graphical, textual, visual, audio, images, binary, and/or the like. Embodiments are not limited in this context.

In some embodiments, computing device 110 may be operative to control, monitor, manage, or otherwise process various operational functions of device 115a-n. In some embodiments, computing device 110 may be operative to provide analytical information 144 and/or operating information to a location on network 150 through a secure or authenticated connection. In some embodiments, computing device 110 may be or may include a stand-alone computing device, such as a personal computer (PC), server, tablet computing device, cloud computing device, mobile computing device (for instance, a smart phone, tablet computing device, and/or the like), data appliance, and/or the like. In various embodiments, computing device 110 may be or may include a controller or control system integrated into device 115a-n to control operational aspects thereof.

Although only one computing device 110 is depicted in FIG. 1, embodiments are not so limited. In various embodiments, the functions, operations, configurations, data storage functions, applications, logic, and/or the like described with respect to computing device 110 may be performed by and/or stored in one or more other computing devices. A single computing device 110 is depicted for illustrative purposes only to simplify the figure.

Computing device 110 may include processor circuitry 120, a memory unit 130, and a transceiver 160. Processor circuitry 120 may be communicatively coupled to memory unit 130 and/or transceiver 160.

Processor circuitry 120 may include and/or may access various logic for performing processes according to some embodiments. For instance, processor circuitry 120 may include and/or may access device model logic 124 and/or diagnostic logic 126. Processing circuitry 120 and/or device model logic 124 and/or diagnostic logic 126, and/or portions thereof, may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 4000. For example, a logic, circuitry, controller, processor, and/or the like may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although diagnostic services logic 122 is depicted in FIG. 1 as being within processor circuitry 120, embodiments are not so limited. In addition, although device model logic 124 and diagnostic logic 126 are depicted as being a logic of diagnostic services logic 122, embodiments are not so limited, as device model logic 124 and diagnostic logic 126 may be separate logics and/or may be standalone logics. For example, diagnostic services logic 122, and/or any component thereof, may be located within an accelerator, a processor core, an interface, an individual processor die, implemented entirely as a software application (for instance, analytical services application 150) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store an analytical services application 150 that may operate, alone or in combination with diagnostic services logic 122, to perform various diagnostic process functions according to some embodiments. In various embodiments, analytical services application 150 may interact with devices 115a-n and/or components thereof through various drivers (for instance, application programming interfaces (APIs) and/or the like), software and/or hardware interfaces, and/or the like.

In various embodiments, diagnostic services logic 122 may be configured to provide and/or implement diagnostic services for devices 115a-n. In some embodiments, diagnostic services may include processes for determining whether devices 115a-n and/or components thereof are operating normally or abnormally. In various embodiments, diagnostic services may include processes for predictive maintenance, for instance, determining whether devices 115a-n and/or components thereof may operate abnormally in the future (for instance, detecting an imminent failure condition). In exemplary embodiments, diagnostic services may include processes for diagnosing a source of abnormal operation (for instance, a failing pump, an inadequate seal, degraded reagent, and/or the like). Embodiments are not limited in this context.

Device model logic 124 may operate to generate models associated with devices 115a-n and/or components thereof. In some embodiments, the models may be stored as diagnostic models 142. In various embodiments, the models may include various computational models, including, without limitation, neural network models. Non-limiting examples of a computational model may include a machine-learning model, an artificial intelligence (AI) model, a neural network (NN), an artificial neural network (ANN), a convolutional neural networks (CNN), a deep learning (DL) network, a deep neural network (DNN), a recurrent neural network (RNNs), combinations thereof, variations thereof, and/or the like. Embodiments are not limited in this context. In some embodiments, each diagnostic model 142 may be associated with at least one diagnostic.

Figure 2:
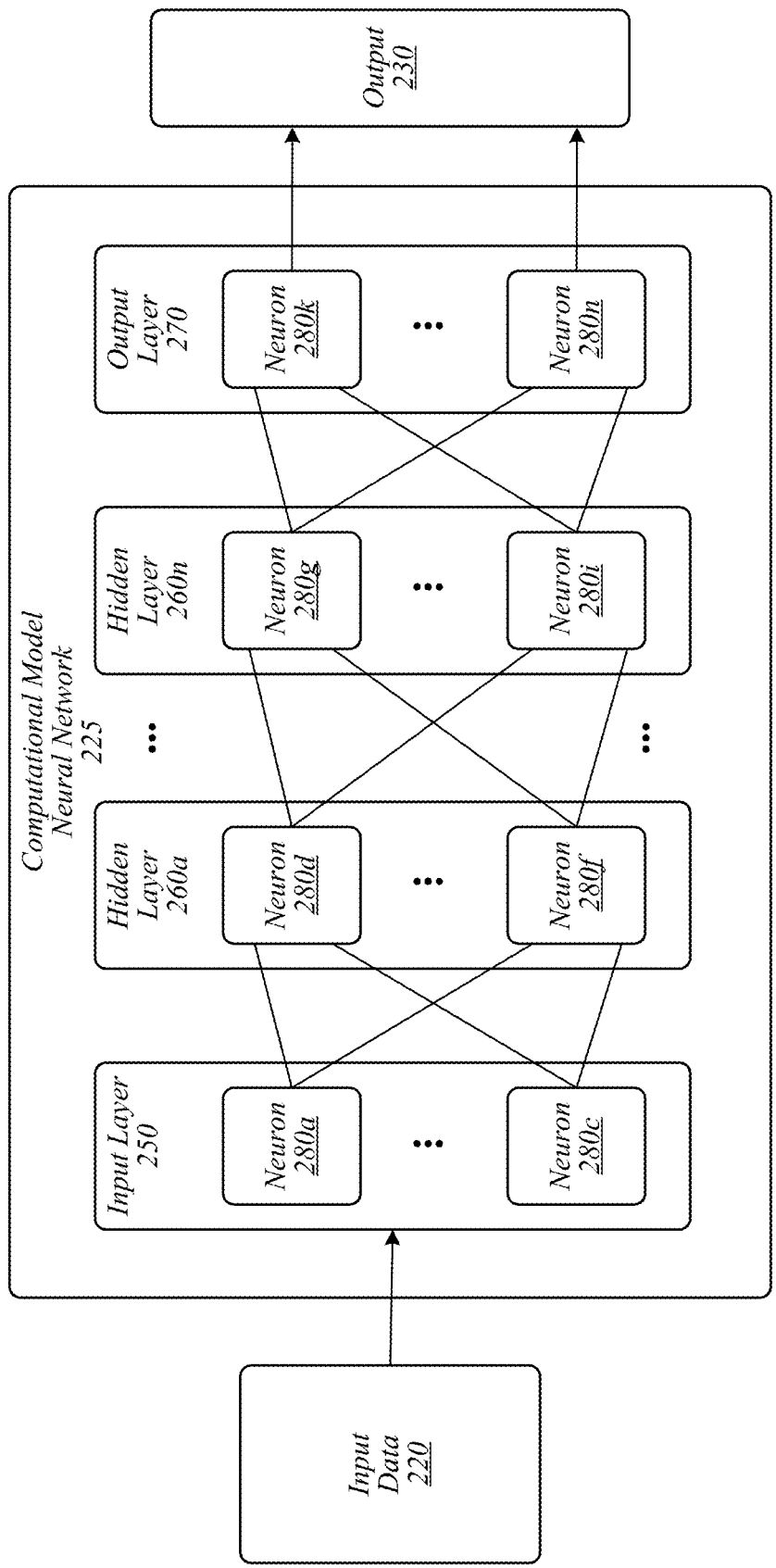
FIG. 2 illustrates an embodiment of a second operating environment.

In some embodiments, diagnostic models 142 may be or may include a neural network. For example, FIG. 2 illustrates an example of an operating environment 200 that may be representative of various embodiments implementing a neural network 225. Although neural network may be used as examples herein, embodiments are not so limited, as any type of model capable of operating according to some embodiments is contemplated herein. In general, a neural network 225 may be formed of a plurality of layers, including input layer 250, hidden layers 260a-n, and output layer 270. Each layer of neural network 225 may include one or more neurons 280a-n. In general, a neuron 280a-n may be a computational unit that takes in one or more inputs, applies a function to the inputs (for instance, an activation function), and generates an output. The neurons 280a-n may be interconnected such that the output from neurons 280a-n in a first layer may be input to the neurons 280a-n in a subsequent layer (and vice versa). For example, the output of neuron 280a of input layer 250 may be provided as input to neurons 280d-f of hidden layer 260a. In general, input layer 250 and output layer 270 may be visible (for instance, accessible for network input or as network output, respectively) outside of neural network 225, such as to software, agents, and/or the like. Hidden layers 260a-n are not accessible externally from neural network 225 and operate as a hidden (or deep) processing structure for processing (for instance, training and/or analyzing) input data received from input layer 250.

Results from the training or analysis may be provided to output layer 280 and transmitted as output 230, for example, to a data consumer. For example, in some embodiments, the diagnostic services process may include a neural network having a form of y=f(x), where y is the output, f is a prediction function, and x is the input. For example, for a training process, given a training set of labeled examples {(x1,y1), . . . , (xN,yN)}, neural network 225 may implement prediction function f by minimizing the prediction error on the training set. In another example, for a testing process, neural network may apply f to new test example x and output the predicted value y=f(x). Embodiments are not limited in this context.

In some embodiments, device model logic 124 may generate and train models based on training information 140. In various embodiments, training information 140 may be generated by an operator (for instance, artificial operating data), generated by operating devices 115a-n and/or components thereof, or combinations thereof. For example, an operator may provide training information 140 generated during the actual operation of a device component, such as a pump, to computing device 110 as training information 140 (for instance, authentic operating data). In another example, devices 115a-n and/or components thereof may be operated to generate training information 140. In some embodiments, operating information 140 may be generated for normal and/or abnormal operation of devices 115a-n and/or components thereof. In one example, an operator may provide operating information 140 that includes channel data associated with operation of a pump under normal conditions. In another example, the operator may provide operating information that includes channel data associated with abnormal operation of the pump, such as a low voltage condition. The operating information 140 may be designated as being normal/abnormal depending on the operating conditions.

Device model logic 124 may apply a computational model, learning process, and/or the like to training information 140 to train the diagnostic model. In various embodiments, a diagnostic model may be generated for one or more diagnostics. In general, a diagnostic or diagnostic unit may include an entire device or system (for instance, group of instruments) or at least one monitored unit of devices 115a-n, channels 117a-n, components thereof, functions thereof, properties thereof, and/or the like. For example, a diagnostic may include a device 115a-n, such as an LC-MS device. In another example, a diagnostic may include a component of a device 115a-n, such as a column, a pump, a valve, and/or the like. In a further example, a diagnostic may include a function of a device 115a-n and/or a component thereof, such as component operation (for instance, opening/closing of a valve, pump operation), and/or the like. In an additional example, a diagnostic may include a property of a device 115a-n and/or a component thereof, such as a temperature, pressure, voltage, status (for instance, on/off, open/closed, and/or the like), and/or the like. In various embodiments, diagnostic model logic 124 may continually train diagnostic models 142 with new information to improve the diagnostic and predictive abilities of diagnostic models 142 (for instance, to achieve a "big data" data store, leading to diagnostic models 142 becoming more accurate).

In some embodiments, diagnostic logic 126 may test a diagnostic model 142, for example, against actual data (for instance, actual channel data) to determine a diagnosis 148, which may include a prediction, operating condition, and/or the like. For example, diagnostic logic may implement $y=f(x)$, where y is the output (for instance, a diagnosis 148), f is a prediction function (for instance, a diagnostic model 142), and x is the input (operating information 146 in the form of actual channel data). For example, data channel 117a may include voltage operating information 146 for a pump of device 115a. Diagnostic logic 126 may use a diagnostic model 142 associated with the pump and/or data channel 117a to receive actual data via data channel 117a as input and may generate a diagnosis relating to whether the pump is operating properly and/or make a diagnosis 148 that includes prediction about the operating life of the pump (for instance, an X % chance of failure within a certain time period).

For example, for a System 1 that includes Device 1-3, the diagnosis 148 may include the following: System 1 100% OK, Device 1 100%, Device 2 100%, Device 3 100%. The diagnosis 148 for System 1 may indicate that System 1 is operating OK at 100% and that Devices 1-3 are operating at 100%. In another example, a diagnosis 148 for System 2 having Device 4-6 may include the following: System 2 66% OK, Device 4 0%, Device 5 100%, Device 6 100%. The diagnosis 148 for System 2 may indicate that System 2 is 66% OK and that Device 4 is operating at 0%. The diagnosis 148 may further predict or otherwise indicate that Device 4 may be the cause of the 66% operational condition of System 2. In various embodiments, the operating information 146 used to generate the diagnoses 148 for System 1 and/or System 2 may be added to training information 140 to increase the volume of data that may be used to generate diagnostic models 142 (for instance, to achieve "big data" to increase model accuracy).

Machine learning according to some embodiments in an analytical environment may provide multiple technological advantages over conventional systems. One non-limiting technological advantage may include improving the speed and accuracy of instrument/system diagnosis many times over what even an expert user can achieve. Another non-limiting technological advantage may include, after training on the initial training data sets, diagnostic models 142 may be continually and automatically updated on startup/set intervals and improved based on additional captures (for instance, made at a customer site) by way of "big data" that may be analyzed computationally to reveal patterns, trends, and associations that may not be efficiently and/or accurately determined via conventional operator methods.

Figure 3:
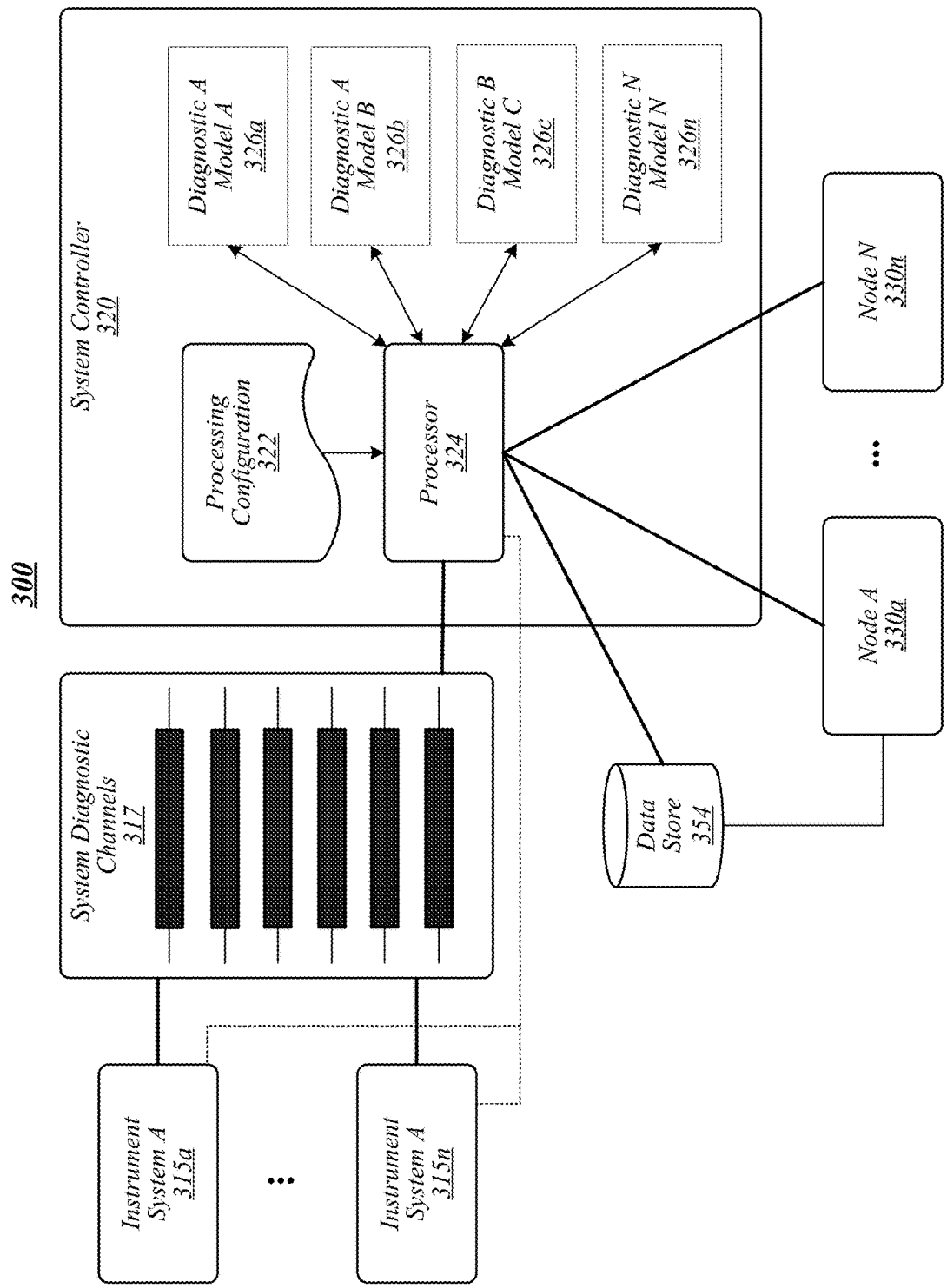
FIG. 3 illustrates an embodiment of a third operating environment.

FIG. 3 illustrates an embodiment of a third operating environment. As shown in FIG. 3, operating environment 300 may include a plurality of instrument systems 315a-n communicatively coupled to a system controller 320a via system diagnostic channels 317. In some embodiments, multiple diagnostic channels 317 may be available for inspection to diagnose internal devices. In various embodiments, there may be one diagnostic channel 317 per monitored element, such as one per sensor. For example, for an LC-MS system, one or more diagnostic channels 317 may be generated via test/injection, and/or the like.

In some embodiments, system controller 320 may include processing configuration 322 and processor 324. In various embodiments, there may be one system controller 320 per instrument system 315a-n. In various other embodiments, a system controller 320 may interact with a plurality of instrument systems 315a-n. Processor 320 may implement various modelling processes (for instance, via machine learning processes) according to some embodiments. For example, processor 320 may implement a training mode and/or a testing mode. In some embodiments, training mode may include using configuration data, specified channel data and associated diagnoses stored in a data store (for instance, a local data store, a cloud data store, and/or the like) as input into a neural network diagnostic model to create a diagnostic model per diagnostic unit (for instance, instrument, system (for example, group of instruments and/or instrument components), device, component, sensor, element, and/or the like). In some embodiments, training mode may include developing pass/fail input/output function(s) via automated machine learning processes to determine the behavior of a given instrument and/or component thereof against a pool of many recorded repeated positive/negative tests (for instance, discrete, simple tests) that occur in the normal operation of the instrument/system (for example, initialization, flow, injection, and/or the like).

In various embodiments, testing mode may include using configuration data and actual (for instance, real-time or substantially real-time) channel data input into an existing neural network diagnostic model for a diagnostic unit to predict a diagnosis 326a-n for the diagnostic unit. In exemplary embodiments, testing mode may include diagnosing issue(s) for a given instrument and/or component thereof after applying the previously obtained pass/fail input/output function(s) to the positive/negative tests of the training mode and adding the results and data collected to the training pool.

In some embodiments, diagnoses 326a-n may be associated with a diagnostic unit and a diagnostic model. For example, diagnosis 326a may be associated with a first diagnostic (for instance, an entire instrument system) and a particular neural network (Neural Network 1) generated for the first diagnostic. In another example, diagnosis 326b may be associated with a second diagnostic (for example, a particular device of an instrument system, such as a pump) and a second neural network (Neural Network 2) associated with the second diagnostic. For diagnoses 326a, processor 324 may receive channel data associated with the first diagnostic and provide the channel data to the corresponding model (for instance, Neural Network 1) to generate diagnosis 326a.

In exemplary embodiments, a processed diagnosis for an instrument system 315a-n (for instance, an entire instrument system and each device of the instrument system) may be reported to the instrument system (for instance, in the form Instrument System A 315a 100% OK, Device 1 100%, Device 2 100%, Device 3 100%; and Instrument System B 66% OK, Device 4 0%, Device 5 100%, Device 6 100%; and/or the like). In various embodiments, diagnoses 326a-n may be stored in data store 354 and/or provided to various nodes 330a-n, such as an operator node, a training supervisor node, a data system node, and/or the like. In some embodiments, a node 330a-n may be operated by a training supervisor or other subject matter expert who may review, annotate, or otherwise analyze diagnoses 326a-n, channel data, and/or the like. In various embodiments, the training supervisor may mark-up channel data, diagnoses, and/or the like to improve training data, diagnostic models, and/or the like.

In some embodiments, one or more diagnostic units (for instance, instrument systems and/or components thereof) may generate time-based digitized binary analog data from internal devices in various possible scenarios, including, without limitation, at rest, a diagnostic test, normal operation (for instance, running a method), and/or the like.

Channel data (for instance, from channels 317) may be subscribed to and read in via a process "Processor" (for instance, processor 324) that resides on a computing device (for instance, system controller 320) that is used to coordinate and control the multiple instruments. In some embodiments, there may be one "System Controller" per system (for instance, group of instruments).

The Processor may read one or more configuration data items to perform the following:
  Training mode—using configuration data, specified channel data, and/or associated diagnosis stored in a data store (local/cloud based) is input into one or more neural network(s) to create a model per instrument/system/device diagnosis. A Training supervisor (for instance, accessing information via Node A 330a) may be a subject matter expert that is used to help markup the initial training data. The machine learning models can be created at any time, such as at set intervals, in the background, on down time, or on the cloud; or
  Testing mode—using configuration data, specified real time channel data input into one or more neural network(s) using an already created model per instrument/system/device to predict one or more diagnosis. The test channel data along with diagnosis may be added to a training datastore (for example, data store 354). Testing for a model y=f(x) may include applying f to new text example x to output the predicted value y.

The processed diagnosis for the entire instrument/system and each device on that instrument/system may be reported to a data consumer, such as an operator, a connected data system, a training supervisor, the instrument/system itself, and/or the like. As the Training datastore gets bigger ("big data") the neural network models get more accurate. The training datastore can be a local or remote (i.e. Amazon Web Service, or similar) database.

FIG. 4 depicts a configuration structure for a diagnostic. For example, configuration 405 may be a configuration file for an analytical instrument, such as an LC-MS instrument. In various embodiments, configuration 405 may delineate properties of one or more diagnostic models, such as inputs, outputs, channels, and/or the like (for instance, in a *.json file). In various embodiments, a diagnostic may be associated with a plurality of configurations, including, without limitation, a capture configuration, a training configuration, a training configuration, and/or the like.

Figure 14:
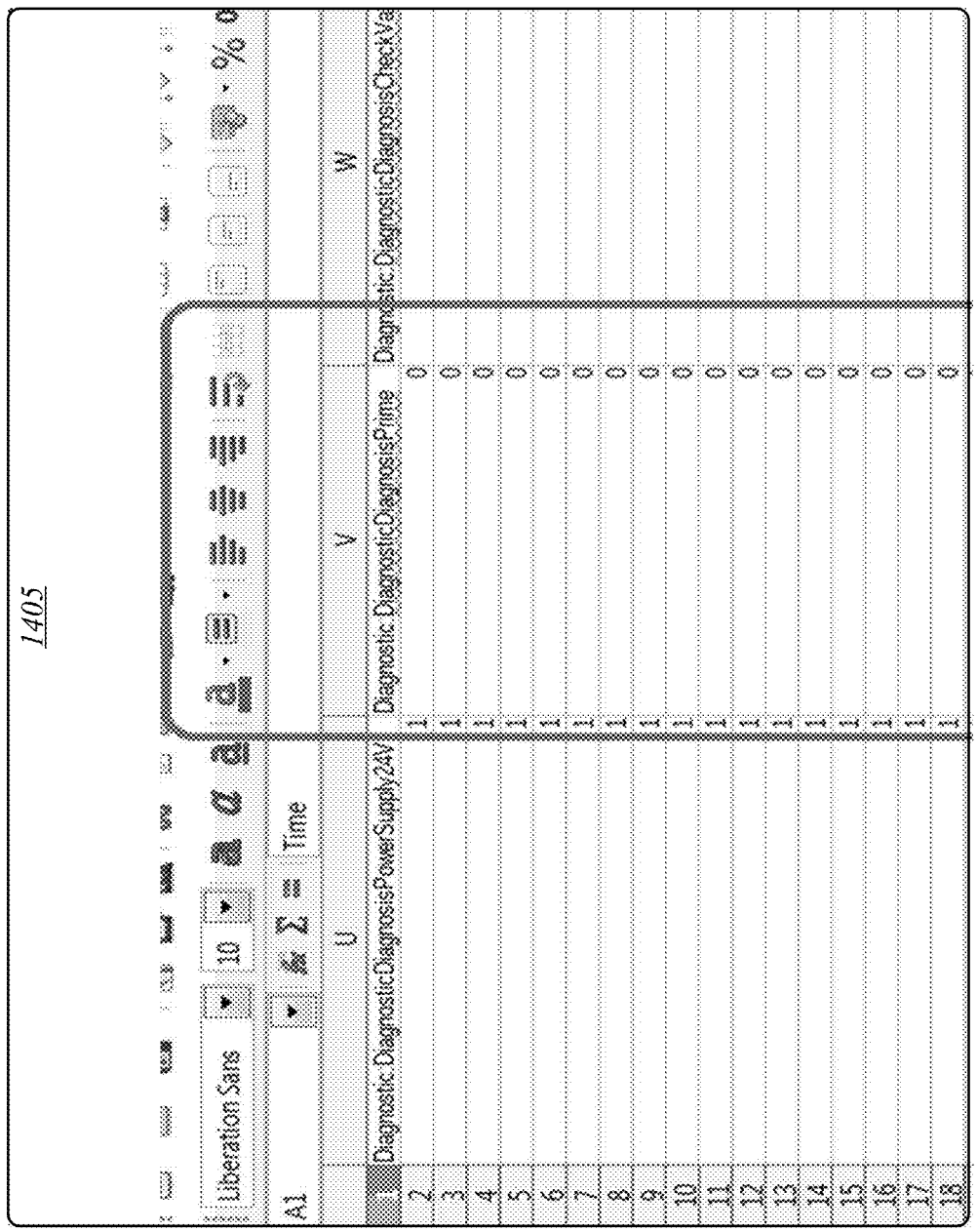

In some embodiments, a first step for diagnostic processes according to some embodiments may be to create the various models (for instance, one for each component or diagnostic of the instrument). Configuration 405 may be used to, among other things, list the inputs/outputs for creating the model for each diagnostic. In various embodiments, inputs may include sensor data, instrument flow/age/alarmCode history, and/or the like. After creating configuration 405, many recordings may be captured of a good example of diagnostic operation. For example, for a pump, flowing at 1 mL/min for 1 minute using a software routine that can be run (on powerup/system startup/injection/ad-hoc). Diagnostic services application and/or a training supervisor may mark all diagnosis columns as GOOD (1) (see, for example, FIGS. 7 and 14). A mass flow meter may optionally be used to verify flow rate is ideal ensuring the diagnostic services application and/or training supervisor marks an appropriate 'good' example. Many recordings of bad scenarios may then be captured of each component with the same criteria (for instance, flowing at 1 mL/min for 1 minute). The neural network may then train against the captured data to create the models. Finally, when a new capture is done at the customer site (on powerup/system startup/injection/ad-hoc), the data may be fed into the diagnostic model (for instance, neural network) which runs against each model giving a diagnosis indicator (for instance, percent OK) value for each component in the instrument/system.

Examples: Diagnostic Scenarios for a Chromatography System

Figure 5:
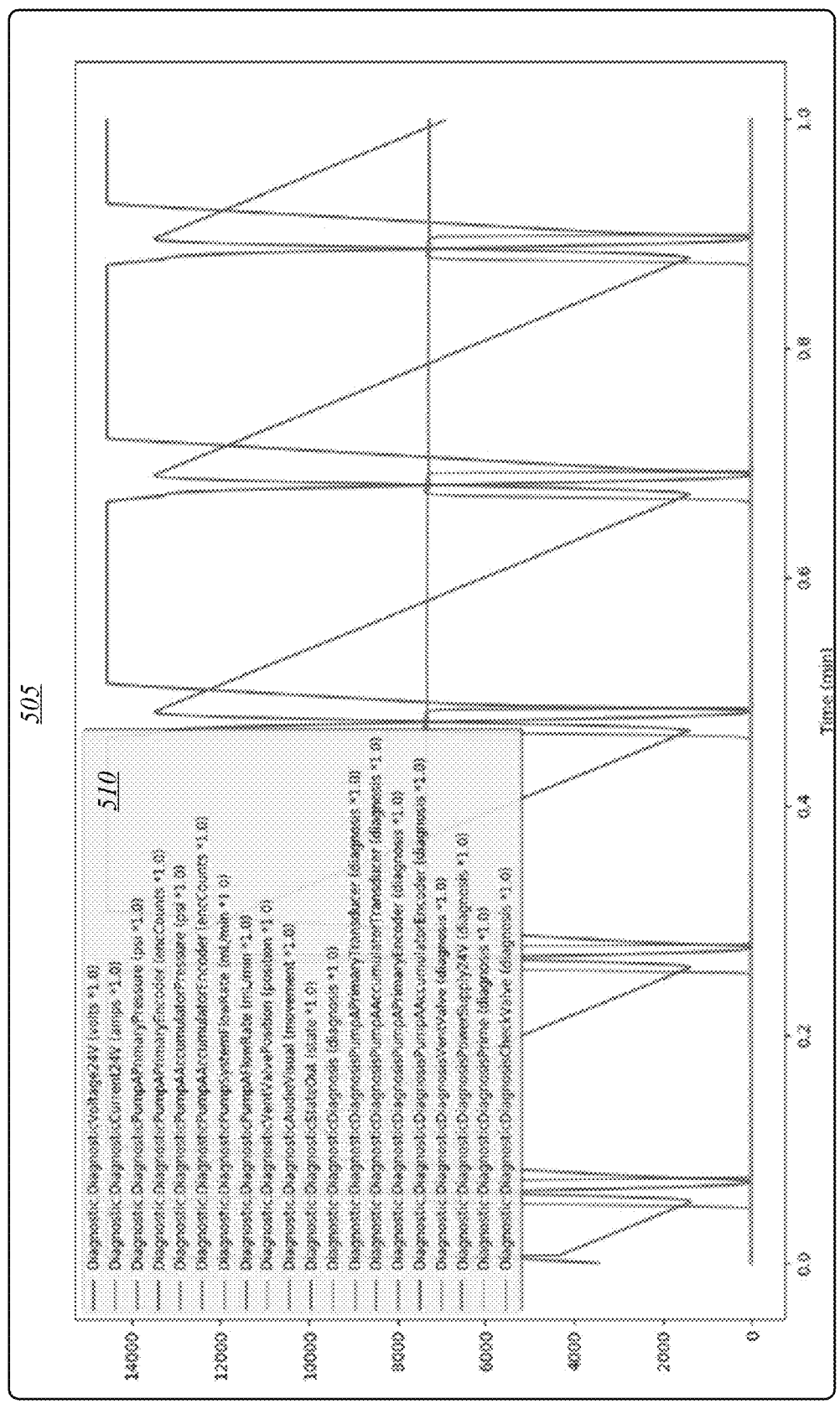
Figure 6:
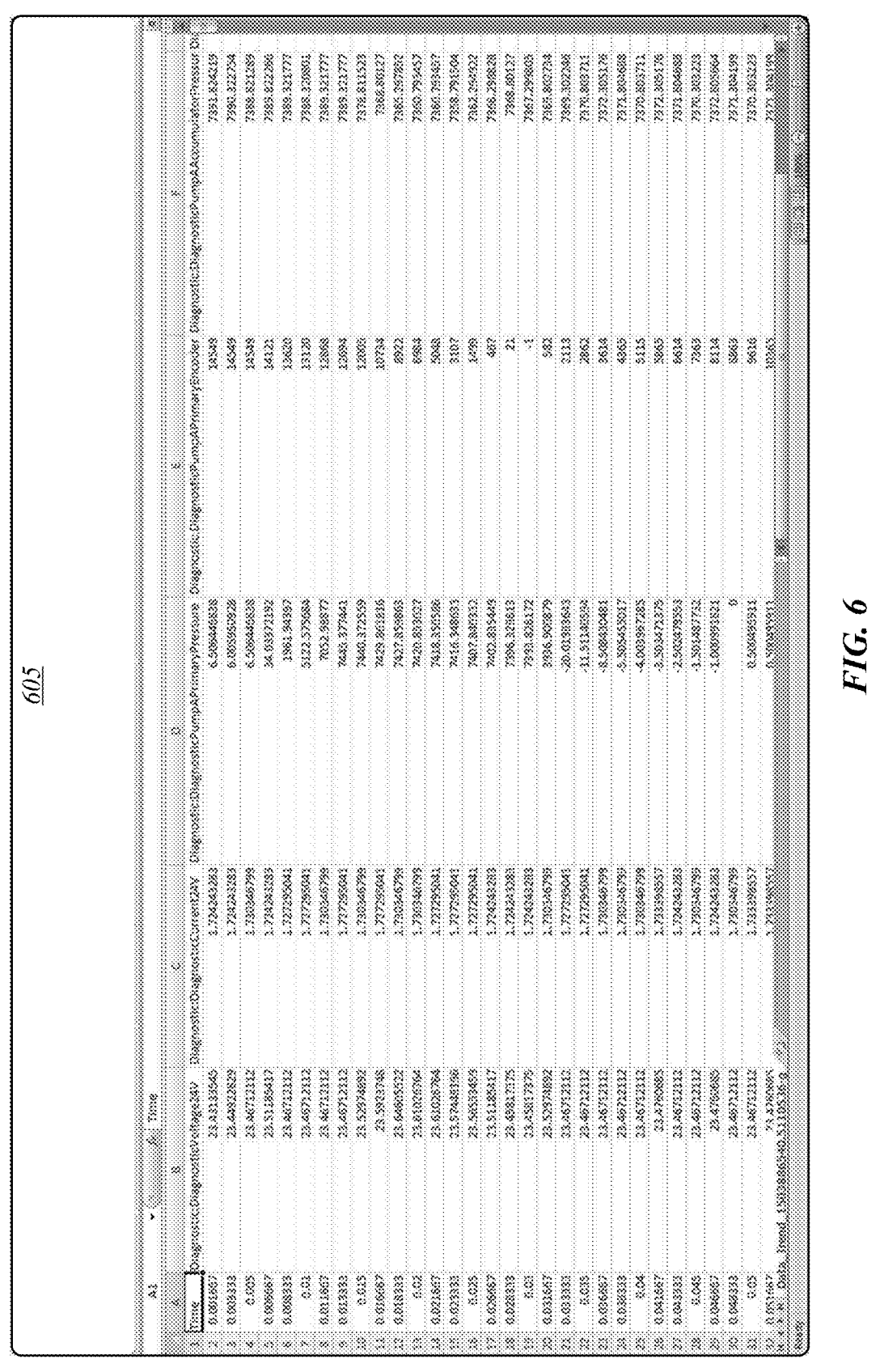
Figure 7:
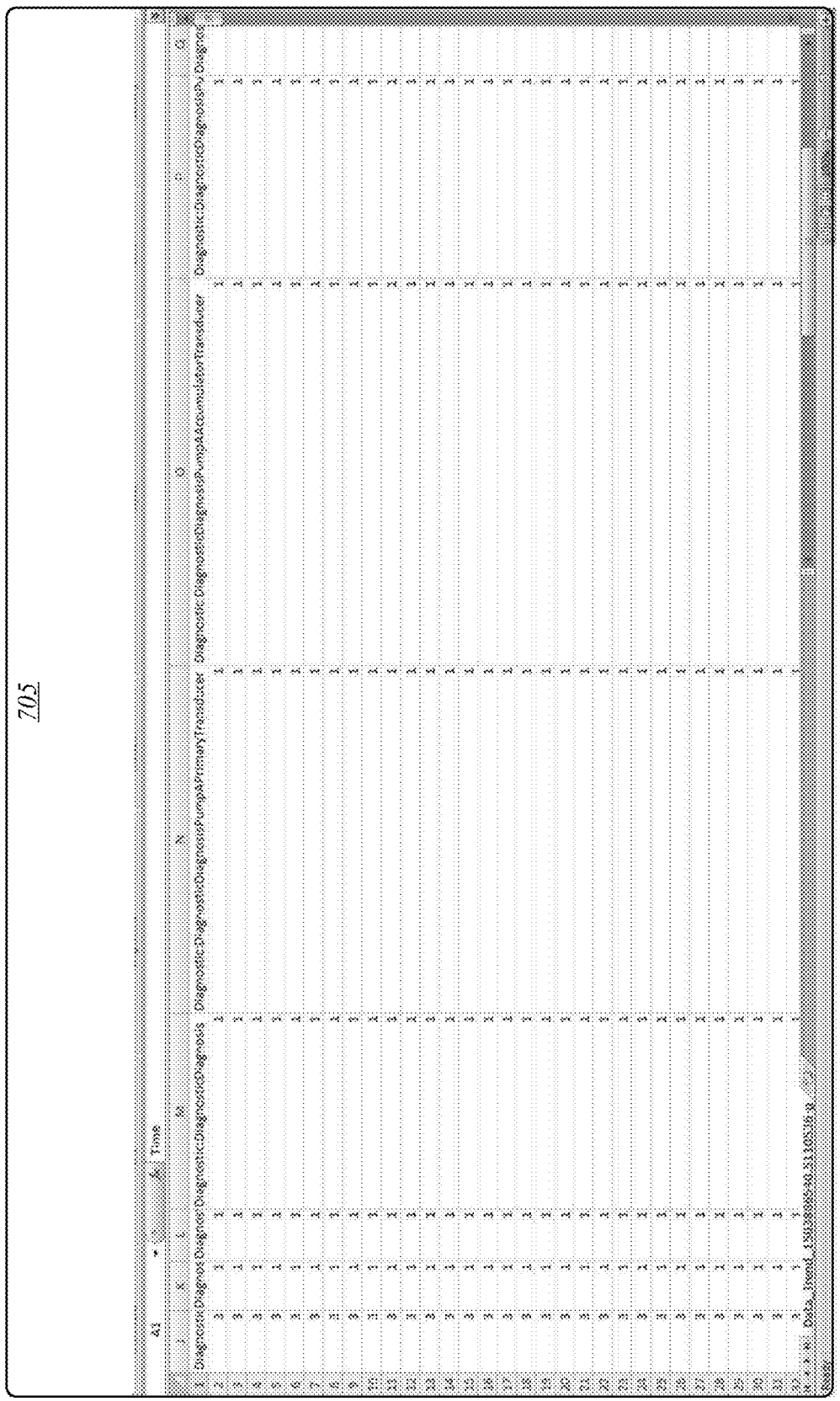
Figure 9:
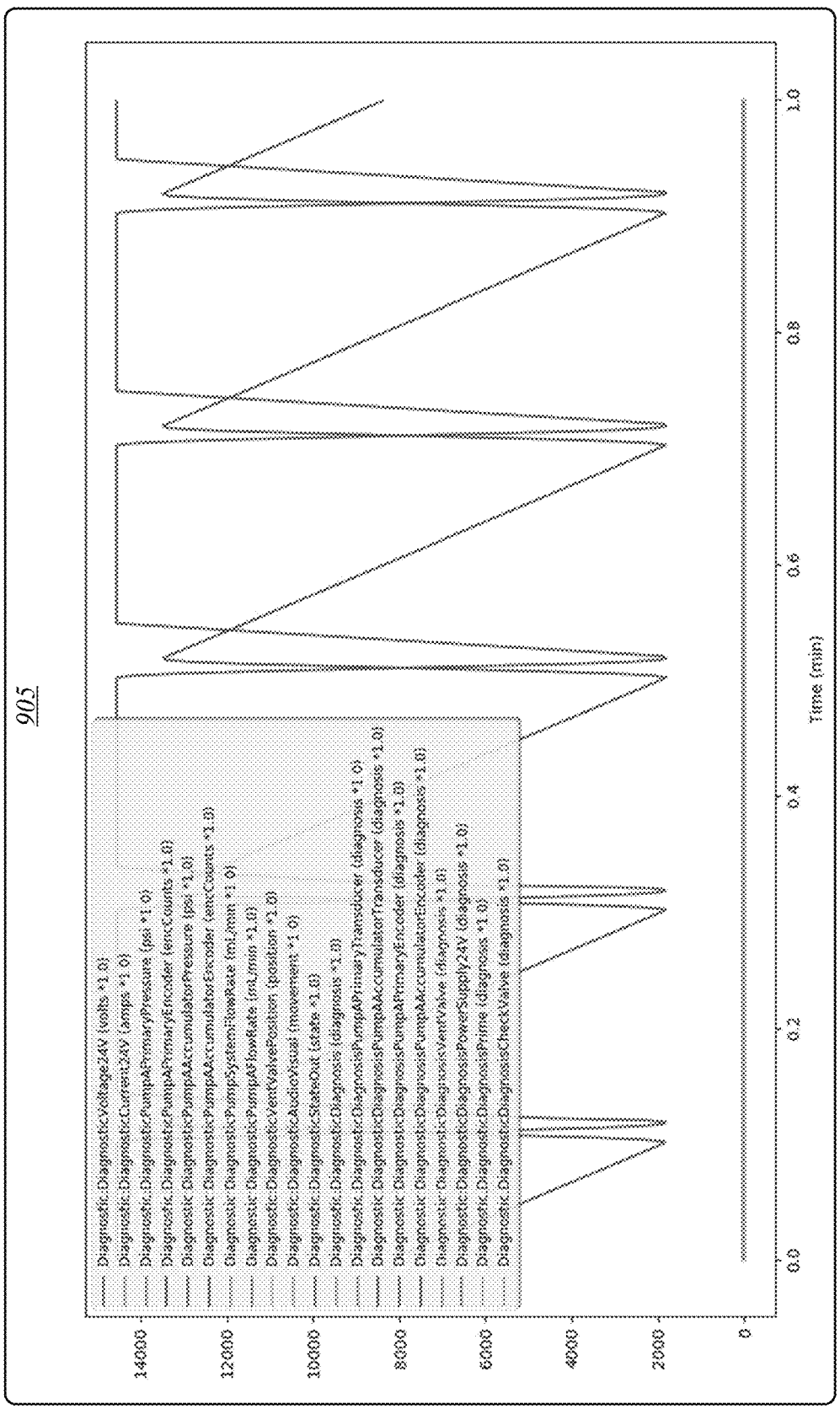
Figure 10:
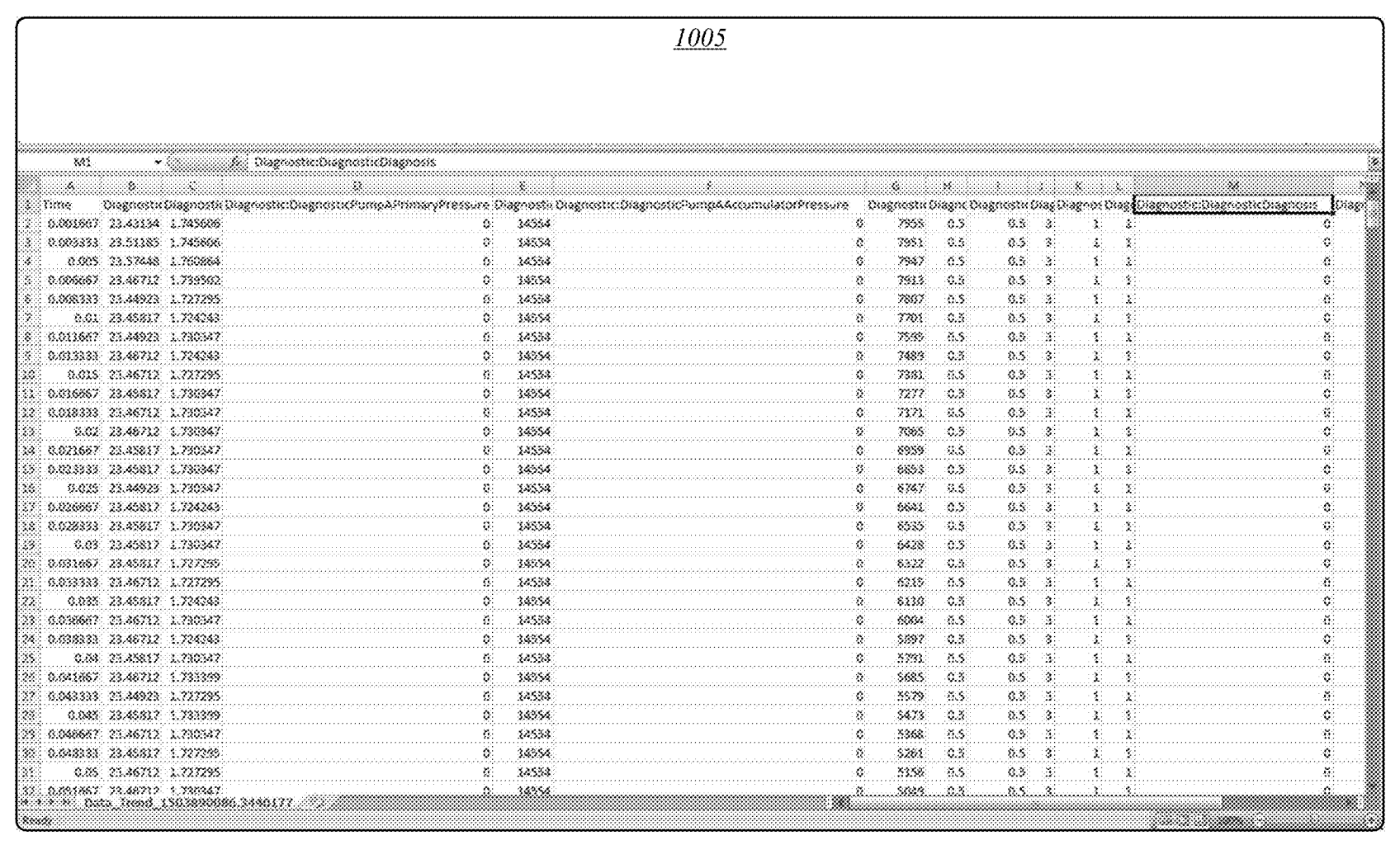
Figure 11:
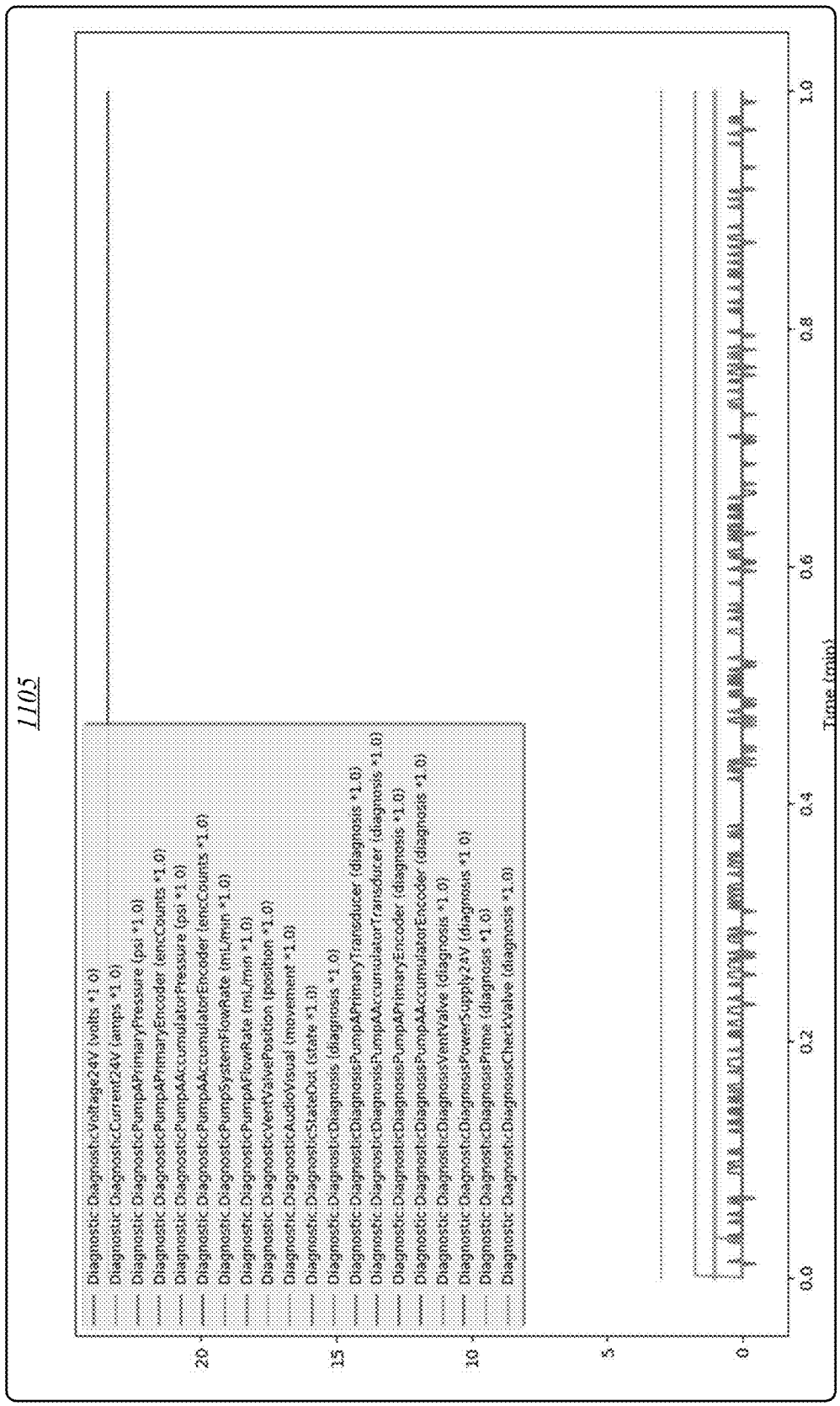
Figure 12:
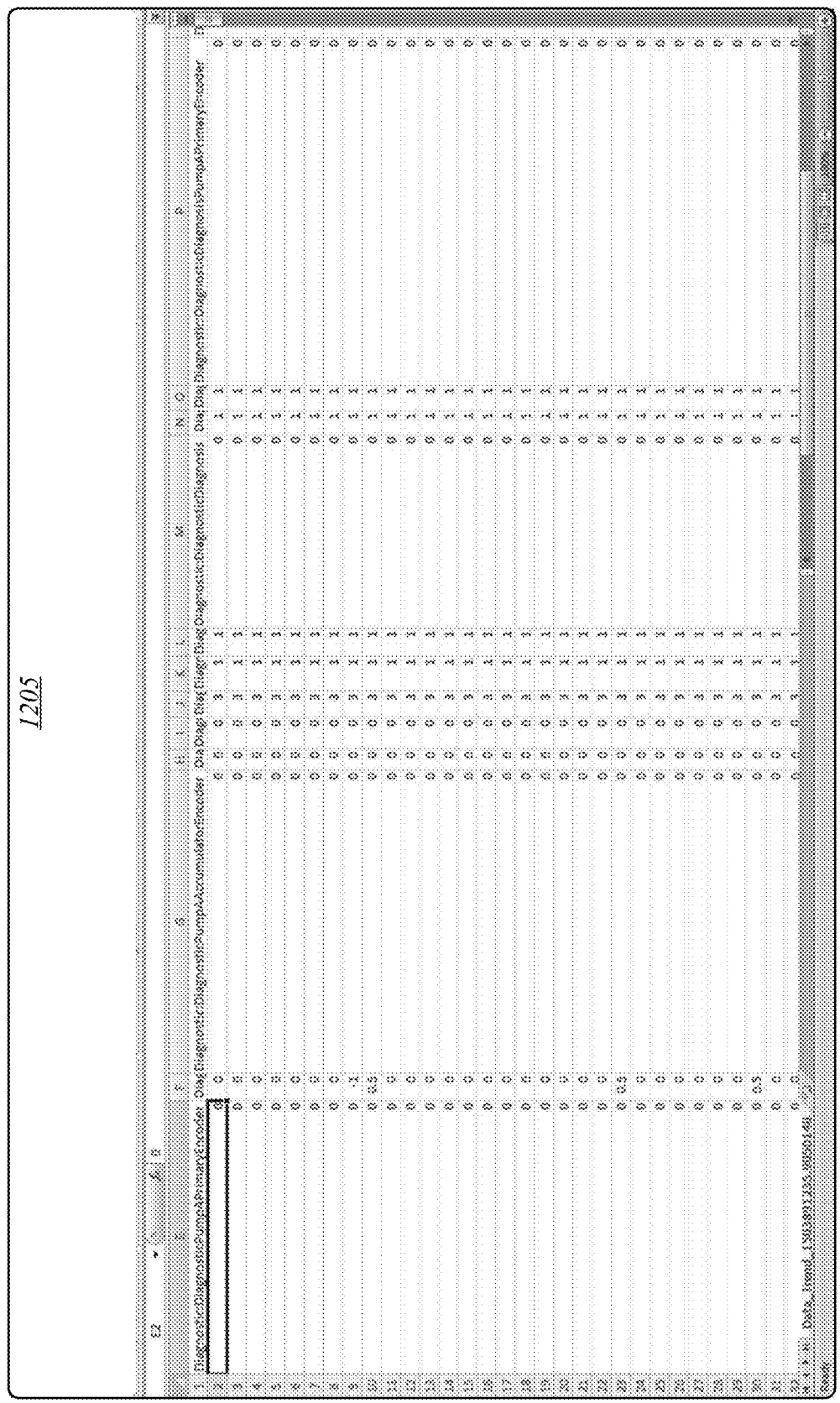

FIG. 5 illustrates graph 505 of a real-time plot for a chromatography system for various diagnostics 510 according to some embodiments. FIGS. 6 and 7 illustrates data capture files 605 and 705, respectively, relating to the data plotted in graph 505. In various embodiments, diagnosis columns may have a value of 1 if OK and 0 if BAD. The initial training data sets may have the diagnosis columns data modified by the diagnostic services application and/or subject matter experts and various 'prime' examples of BAD diagnosis are captured, to aid in obtaining optimal training data to generate the models. In various embodiments, this may only be done initially, as under normal operation, the diagnosis data assignment may be automated. FIG. 8 depicts diagnostic output 805 associated with predictions associated with the information plotted in graph 505. FIG. 9 illustrates graph 905 for a "bad transducers" scenario (for example, transducer output is 0) according to some embodiments, and FIG. 10 illustrates data capture file 1005 relating to the data plotted in graph 905. FIG. 11 illustrates graph 1105 for a "bad encoder" scenario according to some embodiments, and FIG. 12 illustrates data capture file 1205 (for instance, post-supervise) relating to the data plotted in graph 1105.

Figure 13:
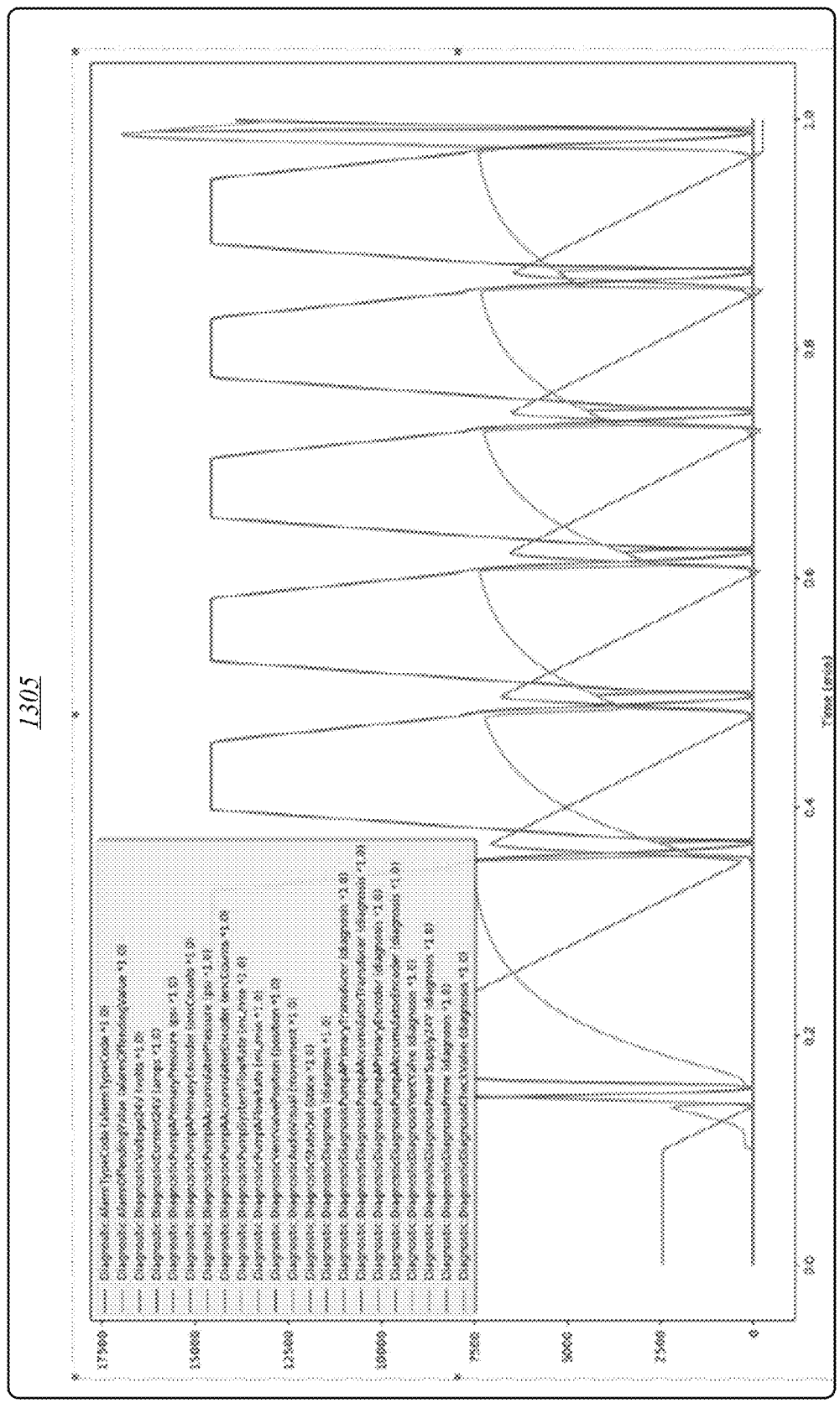

FIG. 13 illustrates graph 1305 of a "loss of prime" scenario according to some embodiments. For example, diagnosis of prime may involve determining when solvent has run out on the solvent supply end. In the scenario of FIG. 13, for instance, accumulator pressure may not be holding, leading to up-and-down behavior. As depicted in data capture file 1405 of FIG. 14, the diagnostic services application and/or training supervisor may annotate this channel's diagnosis column "DiagnosticsDiagnosisPrime" as BAD (0).

Figure 15:
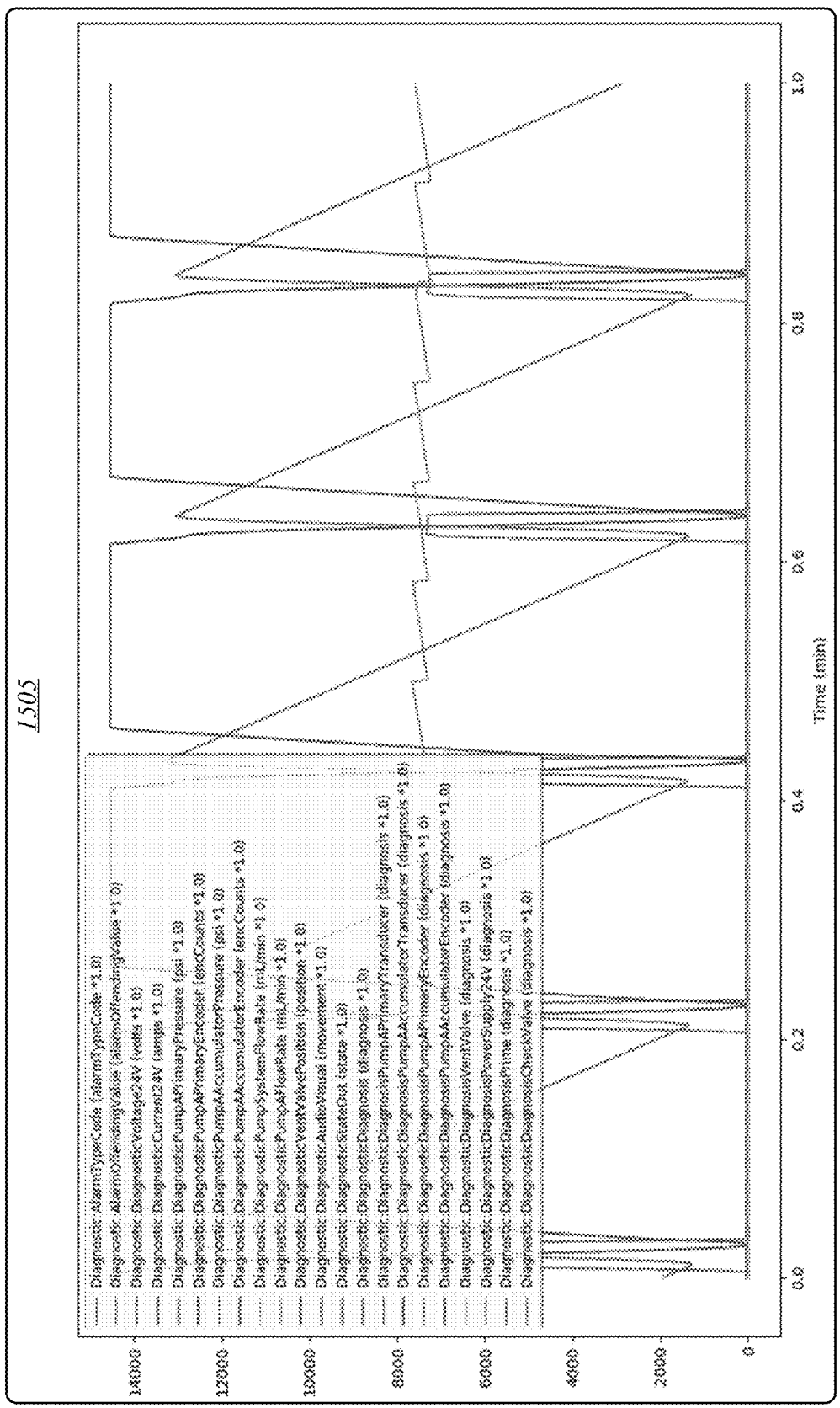
Figure 16:
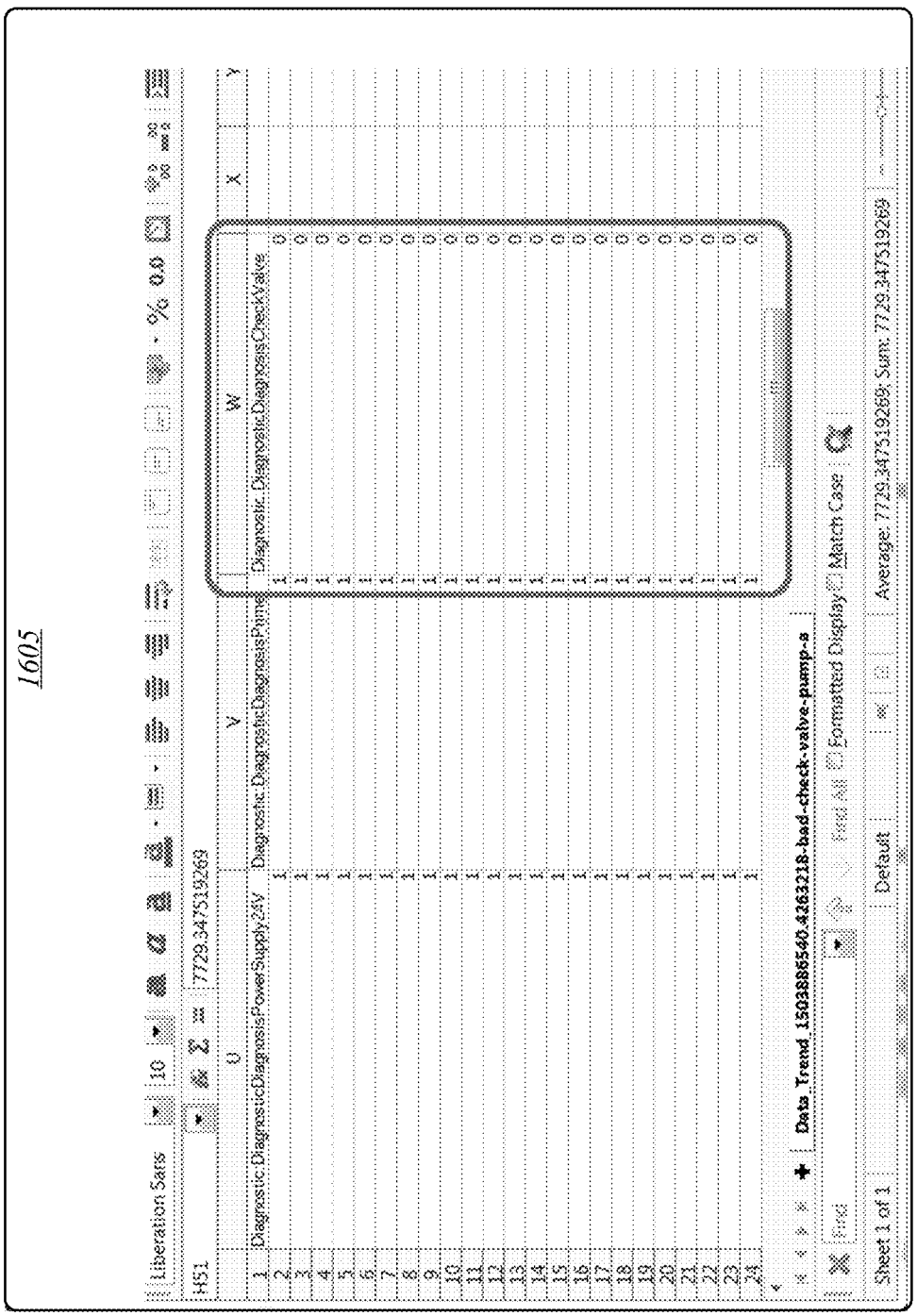
Figure 17:
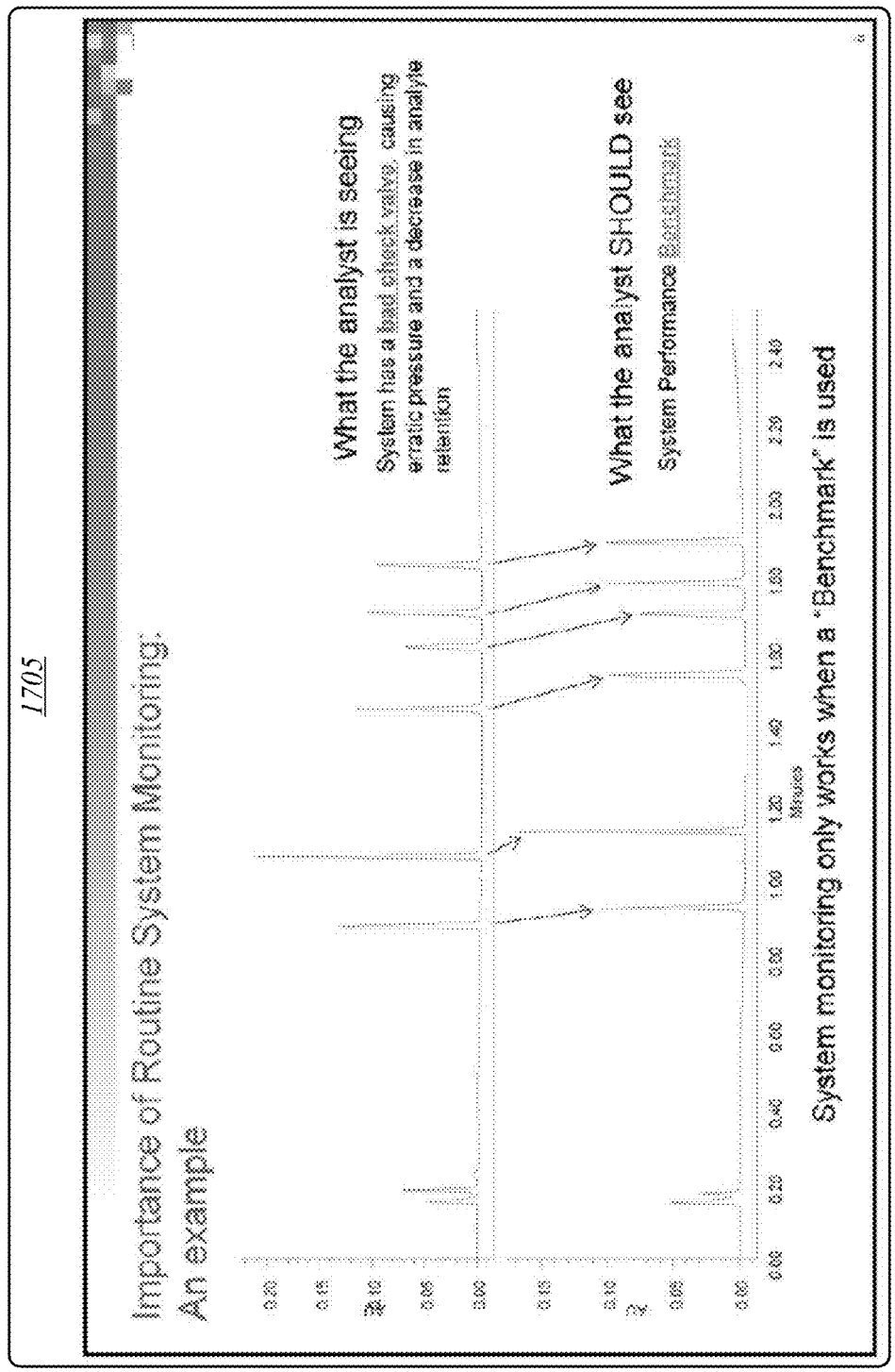
Figure 19:
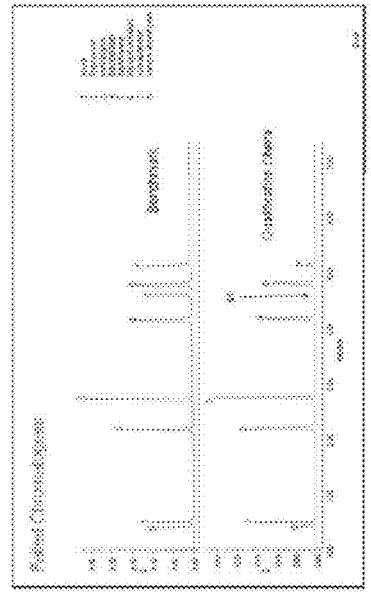
Figure 21:
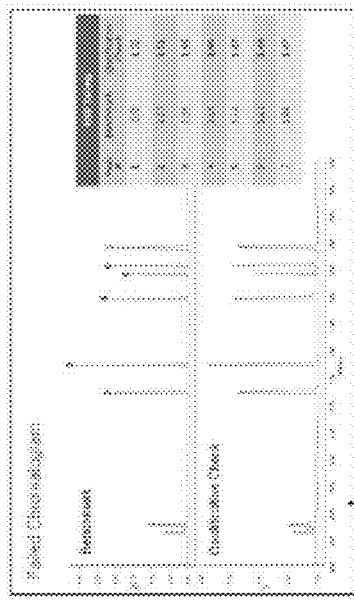
Figure 22:
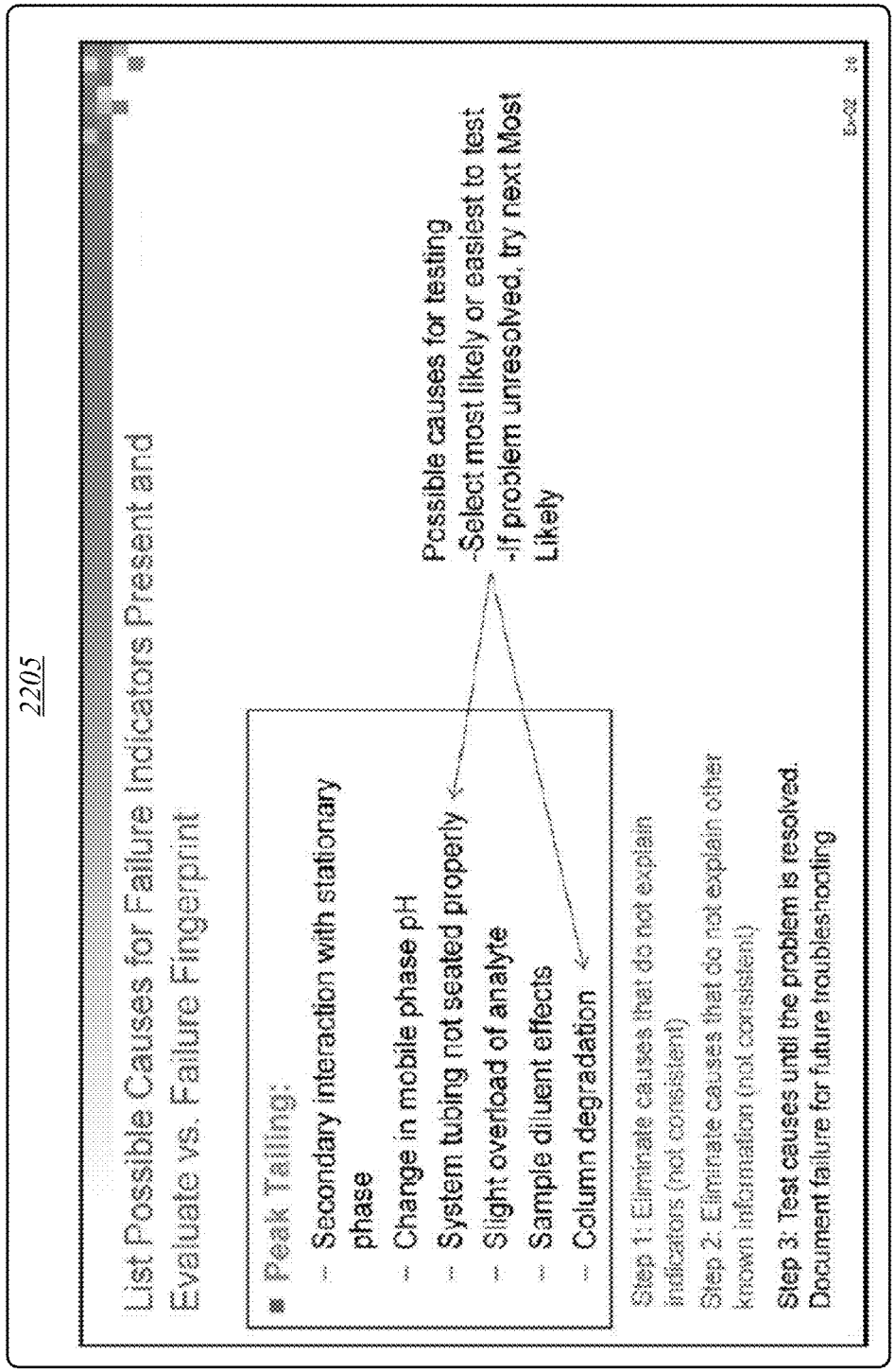
Figure 23:
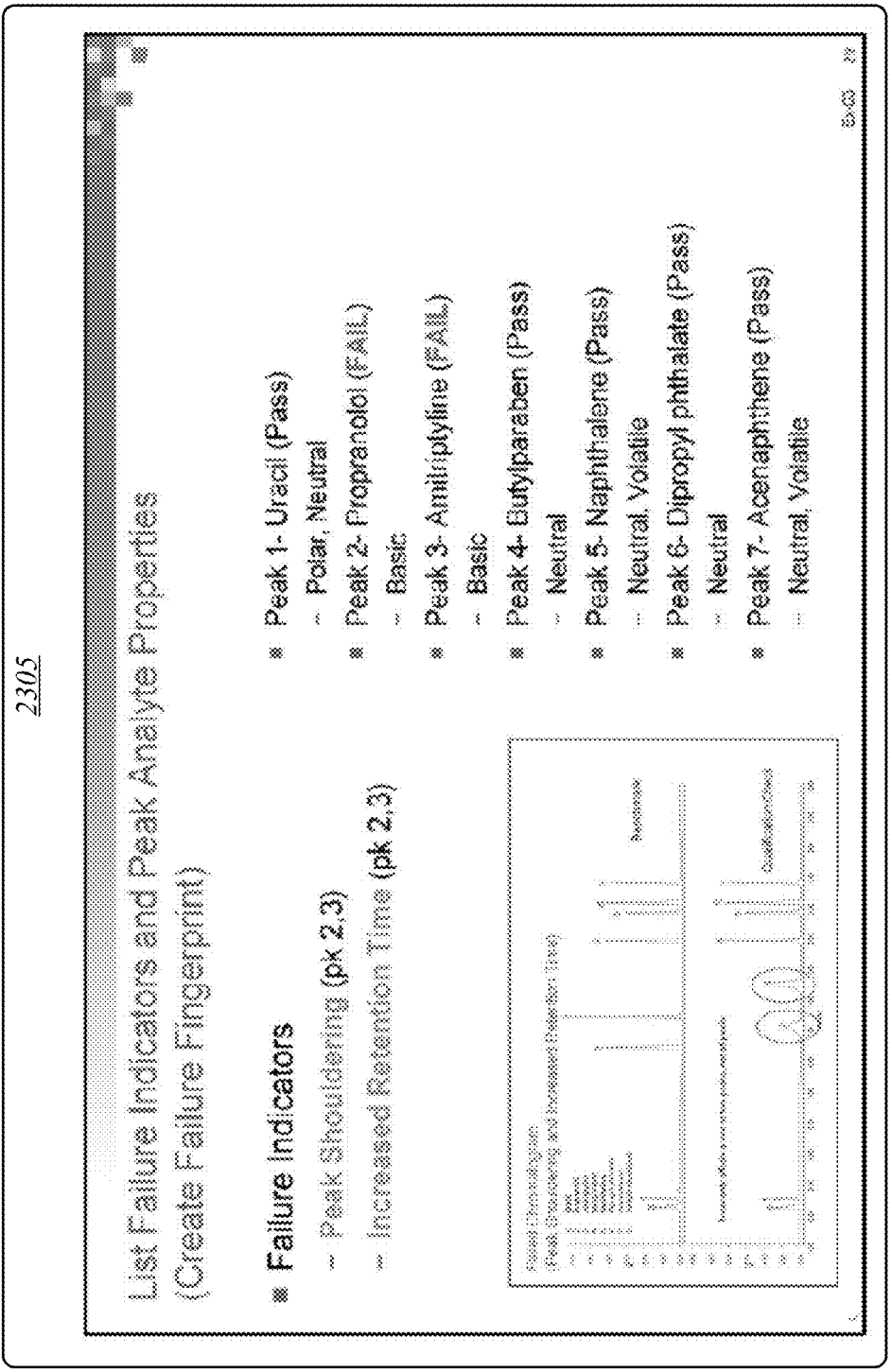
Figure 26:
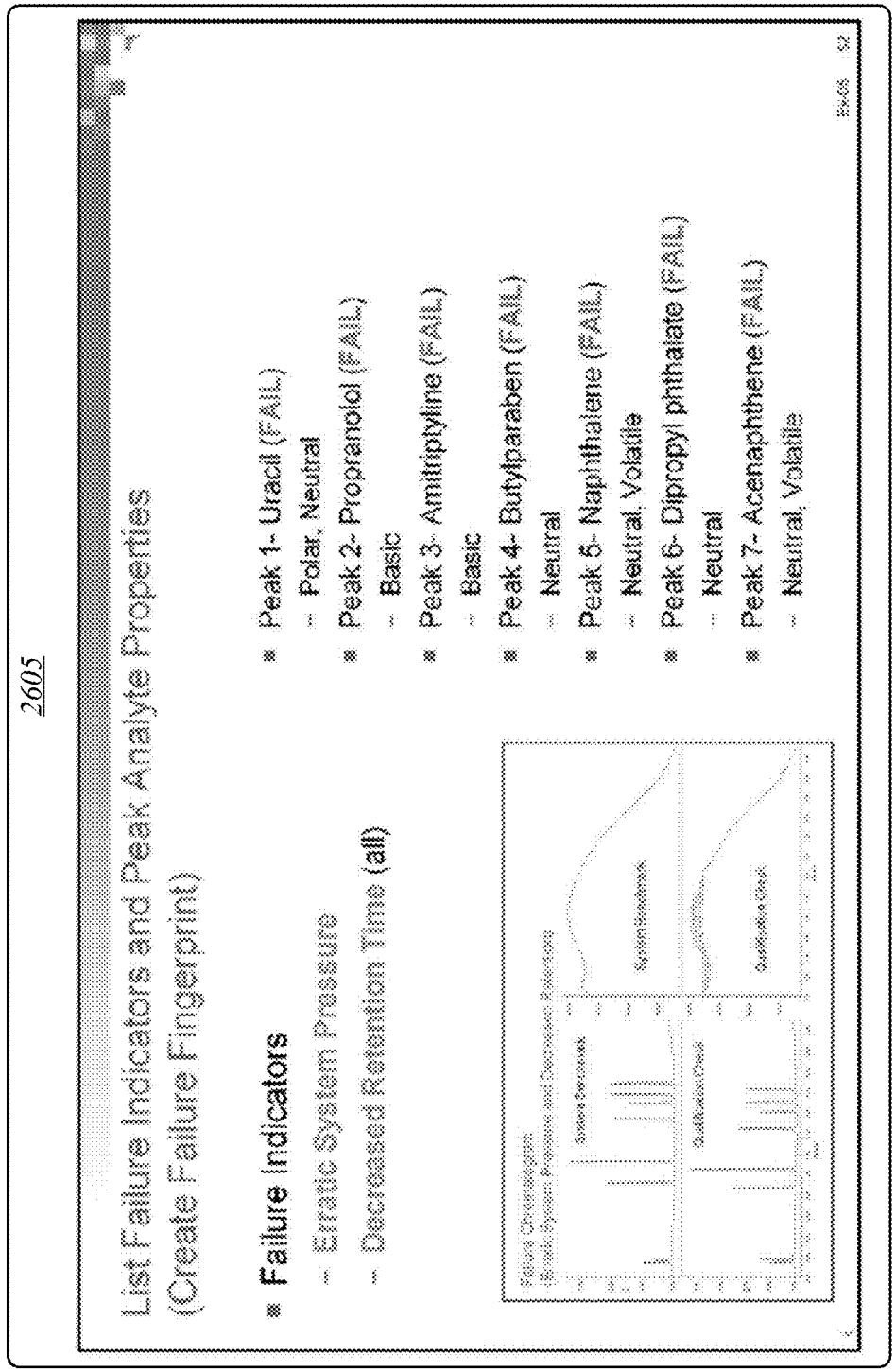
Figure 28:
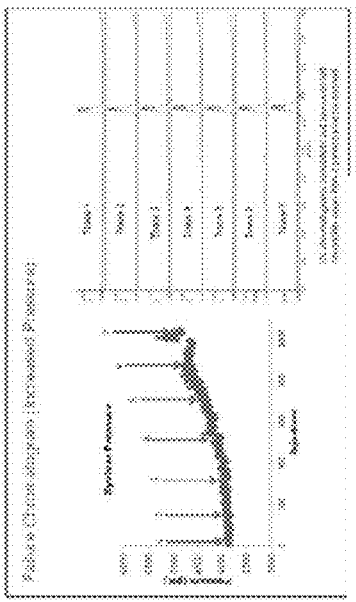
Figure 30:
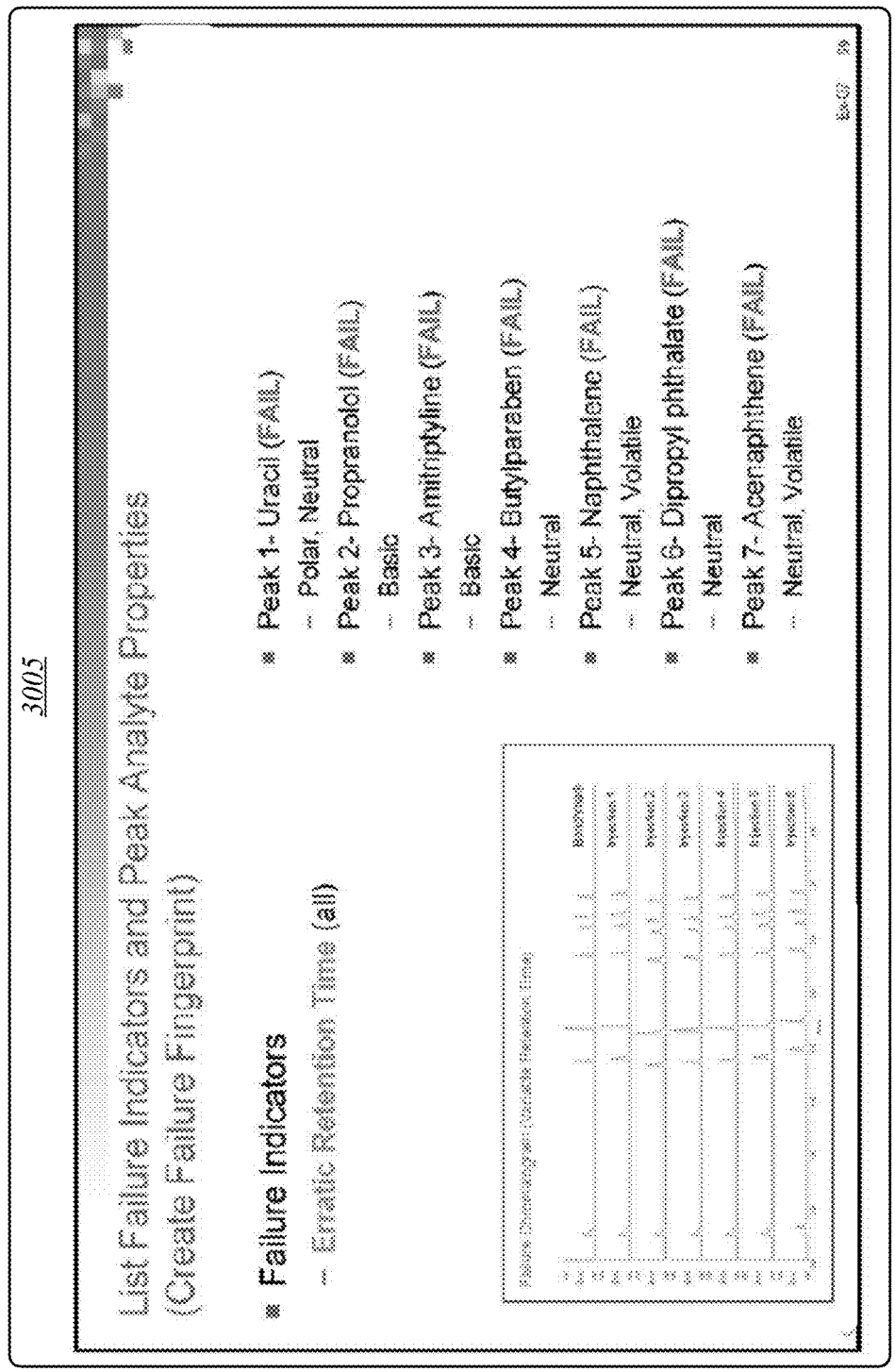
Figure 32:
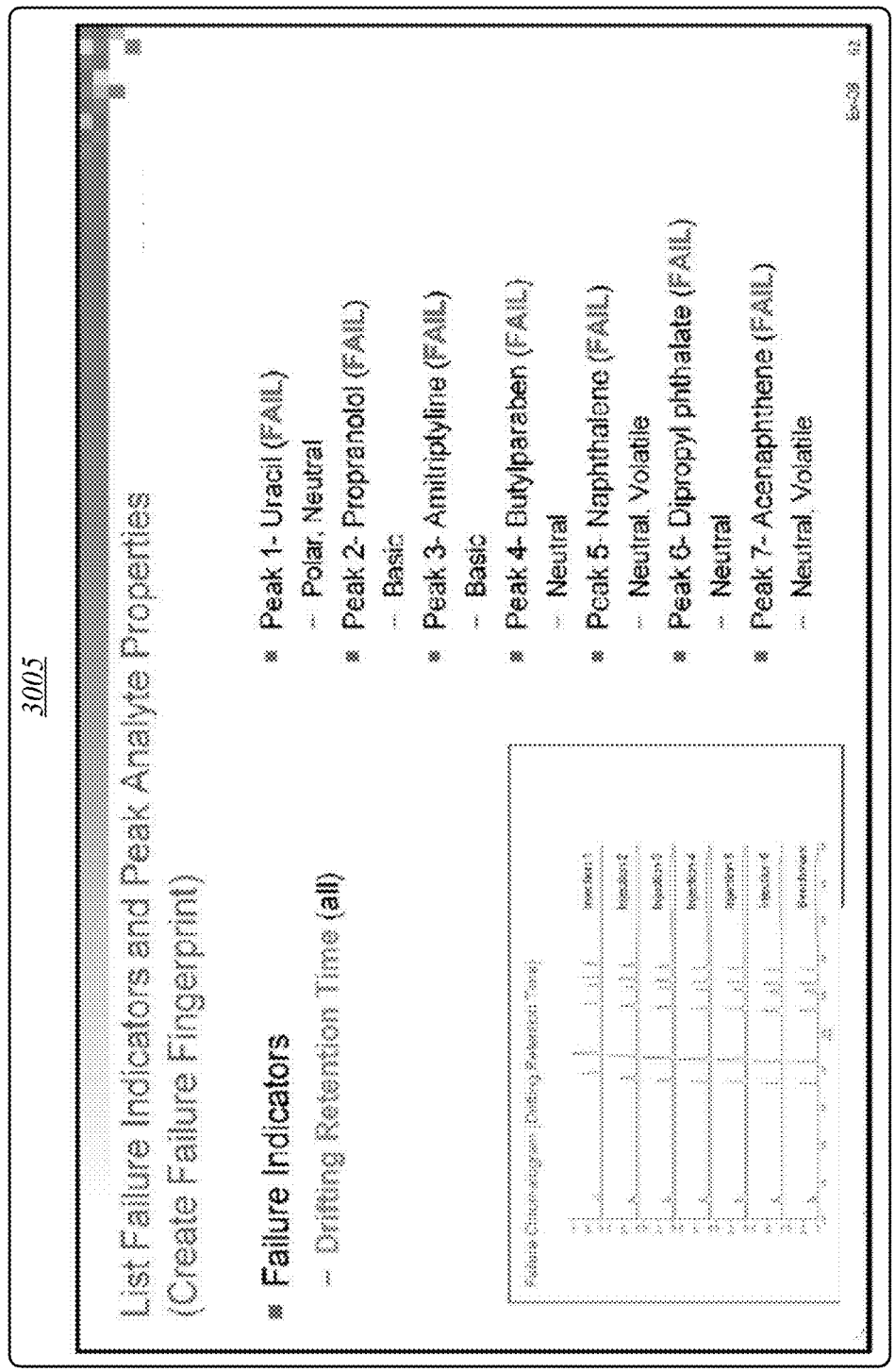
Figure 34:
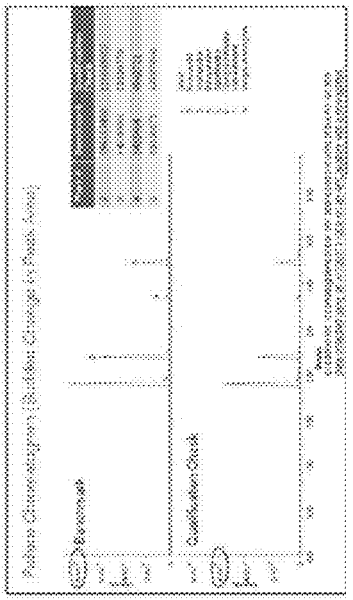
Figure 36:
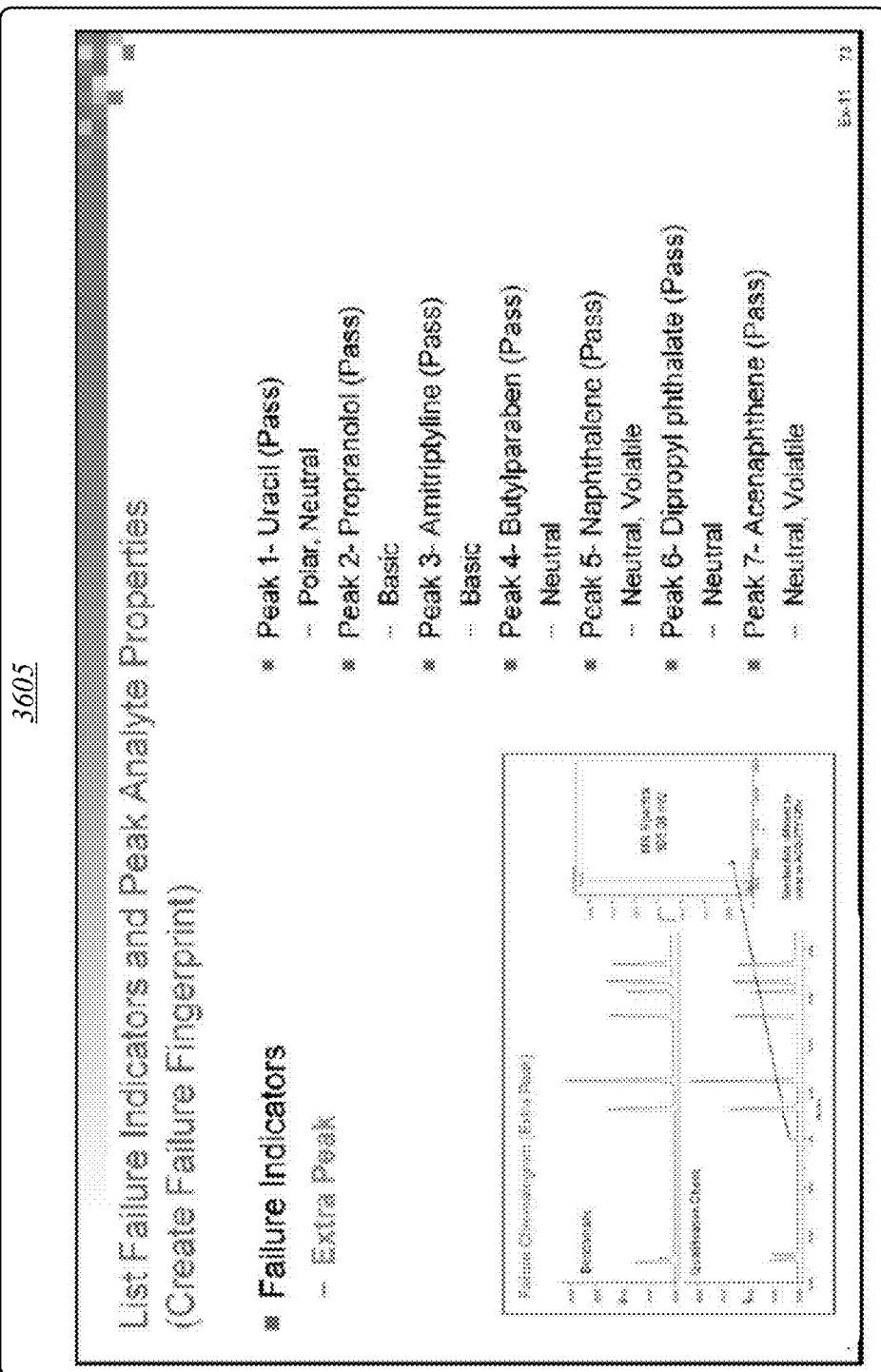
Figure 38:
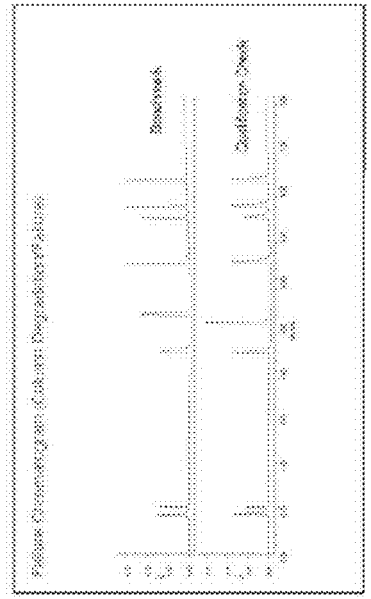

FIG. 15 illustrates graph 1505 of a "bad check valve" (for instance, for an LC pump) scenario according to some embodiments. In the scenario of FIG. 13, for instance, accumulator pressure may have a "ripple" of >1%. For example, diagnosis of a "bad check valve" may occur when the check valve ball is not seating correctly allowing for siphoning of fluid as the pump is performing pump strokes. The state of a check valve may be related to its age and historical flow. As depicted in data capture file 1605 of FIG. 16, the diagnostic services application and/or training supervisor may tag this channel's diagnosis column "DiagnosticsDiagnosisCheckValve" as BAD (0).

In some embodiments, another scenario for a pump component diagnosis versus flowing for 1 min is to capture training and test data during a leak test. The same or similar channels as in FIGS. 13 and 15 may be collected, however different diagnostic models may be used employing a distinct configuration file. The pump leak test performs a pressure ramp-up and then employs feedback control to maintain constant pressure within the pump head. By monitoring plunger travel during the constant pressure phase, it calculates the leak rates of the primary and accumulator actuators. These leak rates can indicate whether the check valves, tubes, fittings, plunger, or plunger seals are faulty. The diagnostic services application and/or training supervisor may tag this channel's diagnosis column "DiagnosticsDiagnosisFlowAccuracy" as BAD (0).

In various embodiments, diagnosis of a "bad flow accuracy" condition may involve something preventing the full flow throughput of solvent delivered by the pump. Capture of a "bad flow accuracy" example of one-minute flow at 1 mL/min in which, for instance, accumulator pressure and/or primary pressure is low and/or encoder acceleration is low. In exemplary embodiments, diagnosis of a "bad seal" may occur when the pump piston chamber has worn out seals, allowing for siphoning of fluid as the pump is performing pump strokes. The state of the pump seals may be related to its age and historical flow. The diagnostic services application and/or training supervisor may tag this channel's diagnosis column "DiagnosticsDiagnosisSeal" as BAD (0). Diagnosis of a "bad column" may occur when the column degrades to the point of overly constricting or allowing flow. This is usually an effect of age of the column and historical flow thru the column. Such a diagnosis may include a capture of a "bad column" example of 1 minute flow at 1 mL/min. In one example, accumulator pressure may have noticeable pressure ripples or higher than normal pressures. The diagnostic services application and/or training supervisor may tag this channel's diagnosis column "DiagnosticsDiagnosisColumn" as BAD (0)

Various detector instruments may be used according to some embodiments, such as ultraviolet detector (UV), an LC detector that measures AU (Absorbance Units), and or detectors that may be used to capture/train/test configuration files for TUV (Tunable UV), FLR, PDA detectors, and/or the like. For example, in some embodiments, each diagnostic (for instance, an instrument) may be associated with a configuration file of its diagnostic settings (for instance, data_analyzer_config_diagnostic_capture_file_tuv.json, data_analyzer_config_diagnostic_train_file_tuv.json, data_analyzer_config_diagnostic_test_file_tuv.json, and/or the like).

FIGS. 17-39 depict illustrative diagnostic scenarios for a chromatography system according to some embodiments. FIG. 18 depicts failure indicators and failure causes for diagnostics for the chromatography system. Failure indicators are changes from benchmark values is the failure indicator categories of changes in peak retention time, changes in peak area, changes in peak shape, changes in peak width, changes in system pressure and change in number of peaks.

Figure 40:
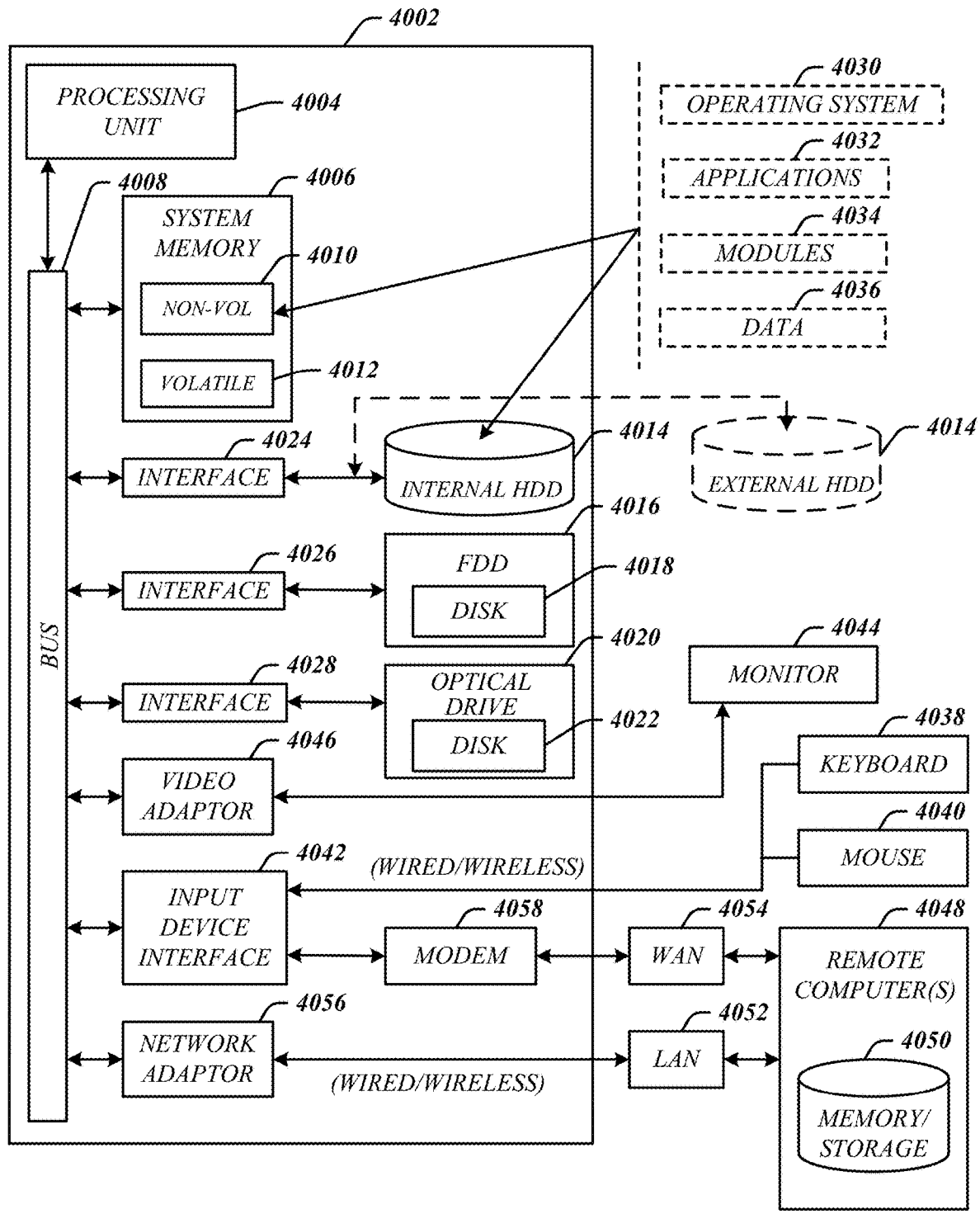
FIG. 40 illustrates an embodiment of a computing architecture.

FIG. 40 illustrates an embodiment of an exemplary computing architecture 4000 suitable for implementing various embodiments as previously described. In various embodiments, the computing architecture 4000 may comprise or be implemented as part of an electronic device. In some embodiments, the computing architecture 4000 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 4000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 4000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 4000.

As shown in FIG. 40, the computing architecture 4000 comprises a processing unit 4004, a system memory 4006 and a system bus 4008. The processing unit 4004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 4004.

The system bus 4008 provides an interface for system components including, but not limited to, the system memory 4006 to the processing unit 4004. The system bus 4008 can be any of several types of bus structure that may further interconnect to a memory bus (with or without a memory controller), a peripheral bus, and a local bus using any of a variety of commercially available bus architectures. Interface adapters may connect to the system bus 4008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 4006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 40, the system memory 4006 can include non-volatile memory 4010 and/or volatile memory 4012. A basic input/output system (BIOS) can be stored in the non-volatile memory 4010.

The computer 4002 may include various types of computer-readable storage media in the form of one or more lower speed memory units, including an internal (or external) hard disk drive (HDD) 4014, a magnetic floppy disk drive (FDD) 4016 to read from or write to a removable magnetic disk 4018, and an optical disk drive 4020 to read from or write to a removable optical disk 4022 (e.g., a CD-ROM or DVD). The HDD 4014, FDD 4016 and optical disk drive 4020 can be connected to the system bus 4008 by a HDD interface 4024, an FDD interface 4026 and an optical drive interface 4028, respectively. The HDD interface 4024 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 4010, 4012, including an operating system 4030, one or more application programs 4032, other program modules 4034, and program data 4036. In one embodiment, the one or more application programs 4032, other program modules 4034, and program data 4036 can include, for example, the various applications and/or components of computing device 110

A user can enter commands and information into the computer 4002 through one or more wire/wireless input devices, for example, a keyboard 4038 and a pointing device, such as a mouse 4040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 4004 through an input device interface 4042 that is coupled to the system bus 4008 but can be connected by other interfaces such as a parallel port, IEEE 1394 serial port, a game port, a USB port, an IR interface, and so forth.

A monitor 4044 or other type of display device is also connected to the system bus 4008 via an interface, such as a video adaptor 4046. The monitor 4044 may be internal or external to the computer 4002. In addition to the monitor 4044, a computer typically includes other peripheral output devices, such as speakers, printers, and so forth.

The computer 4002 may operate in a networked environment using logical connections via wire and/or wireless communications to one or more remote computers, such as a remote computer 4048. The remote computer 4048 can be a workstation, a server computer, a router, a personal computer, portable computer, microprocessor-based entertainment appliance, a peer device or other common network node, and typically includes many or all of the elements described relative to the computer 4002, although, for purposes of brevity, only a memory/storage device 4050 is illustrated. The logical connections depicted include wire/wireless connectivity to a local area network (LAN) 4052 and/or larger networks, for example, a wide area network (WAN) 4054. Such LAN and WAN networking environments are commonplace in offices and companies, and facilitate enterprise-wide computer networks, such as intranets, all of which may connect to a global communications network, for example, the Internet.

When used in a LAN networking environment, the computer 4002 is connected to the LAN 4052 through a wire and/or wireless communication network interface or adaptor 4056. The adaptor 4056 can facilitate wire and/or wireless communications to the LAN 4052, which may also include a wireless access point disposed thereon for communicating with the wireless functionality of the adaptor 4056.

When used in a WAN networking environment, the computer 4002 can include a modem 4058, or is connected to a communications server on the WAN 4054 or has other means for establishing communications over the WAN 4054, such as by way of the Internet. The modem 4058, which can be internal or external and a wire and/or wireless device, connects to the system bus 4008 via the input device interface 4042. In a networked environment, program modules depicted relative to the computer 4002, or portions thereof, can be stored in the remote memory/storage device 4050. It will be appreciated that the network connections shown are exemplary and other means of establishing a communications link between the computers can be used.

The computer 4002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   at least one memory; and
   logic coupled to the at least one memory, the logic to:
   receive chromatography data originating from a chromatography system;
   process the chromatography data using a computational machine learning model to diagnose a failure of the chromatography system by identifying one of a change in peak retention time, a change in peak area, a change in peak shape, a change in peak width, a change in system pressure, or a change in a number of peaks relative to respective benchmark values, wherein the computational learning model has been trained on training chromatography data to identify such a failure; and
   output a diagnosis of the failure.

2. The apparatus of claim 1, the chromatography data comprising a chromatogram.

3. The apparatus of claim 1, the logic further configured to determine at least one cause of the failure.

4. The apparatus of claim 1, the computational machine learning model comprising at least one of a deep learning (DL) computational model, a neural network, a convolutional neural network (CNN), a recurrent neural network (RNN), or a multilayer perceptron (MLP) model.

5. The apparatus of claim 1, the logic to present the diagnosis on a display device operably coupled to the logic.

6. A method performed by a processor of an apparatus, comprising:
   receiving chromatography data originating from a chromatography system at the processor;
   processing the chromatography data with the processor using a computational machine learning model to diagnose a failure of the chromatography system by identifying one of a change in peak retention time, a change in peak area, a change in peak shape, a change in peak width, a change in system pressure, or a change in a number of peaks relative to respective benchmark values, wherein the computational learning model has been trained on training chromatography data to identify such a failure; and
   outputting a diagnosis of the failure on a display device.

7. The method of claim 6, wherein the chromatographic data comprises a chromatogram.

8. The method of claim 6, further comprising, with the processor, determining the cause of the failure.

9. The method of claim 6, wherein the computational machine learning model comprises at least one of a deep learning (DL) computational model, a neural network, a convolutional neural network (CNN), a recurrent neural network (RNN), or a multilayer perceptron (MLP) model.

10. A non-transitory computer-readable storage medium storing processor-executable instructions that when executed by the processor cause the processor to:
    receive chromatography data originating from a chromatography system at the processor;
    process the chromatography data with the processor using a computational machine learning model to diagnose a failure of the chromatography system by identifying one of a change in peak retention time, a change in peak area, a change in peak shape, a change in peak width, a change in system pressure, or a change in a number of peaks relative to respective benchmark values, wherein the computational learning model has been trained on training chromatography data to identify such a failure; and
    output a diagnosis of the failure on a display device.

11. The non-transitory computer-readable storage medium of claim 10, wherein the chromatographic data comprises a chromatogram.

12. The non-transitory computer-readable storage medium of claim 10, further storing instructions that when executed by the processor cause the processor to determine the cause of the failure.

13. The non-transitory computer-readable storage medium of claim 10, wherein the computational machine learning model comprises at least one of a deep learning (DL) computational model, a neural network, a convolutional neural network (CNN), a recurrent neural network (RNN), or a multilayer perceptron (MLP) model.

* * * * *